United States Patent [19]
Ota et al.

[11] Patent Number: 6,115,615
[45] Date of Patent: Sep. 5, 2000

[54] CELLULAR COMMUNICATION NETWORK AND ITS COMMUNICATION METHOD

[75] Inventors: Takeshi Ota; Kouichi Yoshimura; Kazunori Horikiri, all of Nakai-machi, Japan

[73] Assignee: Fuji Xerox Co., Ltd., Tokyo, Japan

[21] Appl. No.: 08/810,112

[22] Filed: Feb. 25, 1997

[30] Foreign Application Priority Data

| Feb. 26, 1996 | [JP] | Japan | 8-037601 |
| Feb. 10, 1997 | [JP] | Japan | 9-026263 |

[51] Int. Cl.[7] .................................................. H04B 7/26
[52] U.S. Cl. .......................... 455/553; 455/552; 455/445
[58] Field of Search .............................. 455/554, 555, 455/426, 445, 432, 552, 463, 462, 437, 440, 553; 370/338, 328; 359/118, 145

[56] References Cited

U.S. PATENT DOCUMENTS

| 5,282,257 | 1/1994 | Ota . | |
| 5,301,400 | 4/1994 | Sawyer et al. | 455/445 |
| 5,396,647 | 3/1995 | Thompson et al. | 455/440 |
| 5,400,338 | 3/1995 | Flammer et al. | 455/445 |
| 5,479,595 | 12/1995 | Israelsson | 359/145 |
| 5,506,887 | 4/1996 | Emery et al. | 455/445 |
| 5,598,458 | 1/1997 | Bales et al. | 455/418 |
| 5,640,676 | 6/1997 | Garneurz et al. | 455/437 |
| 5,732,127 | 3/1998 | Hayes | 379/115 |
| 5,812,531 | 9/1998 | Cheung et al. | 455/445 |

FOREIGN PATENT DOCUMENTS

| 2-162846 | 6/1990 | Japan . |
| 2-235447 | 9/1990 | Japan . |
| 3-91329 | 4/1991 | Japan . |
| 4-506294 | 10/1992 | Japan . |
| 6-164498 | 6/1994 | Japan . |
| 6-311083 | 11/1994 | Japan . |

OTHER PUBLICATIONS

"Dynamic Range on Fiber–Radio Microcell Radio System," Proceeding of the 1994 IEICE Spring Conference B 488. H. Arai et al., 1994.

Ota, Takeshi. "Coupled Star Network: A New Configuration for Optical Local Area Network." *IEICE Trans. Commun.*, vol. E75–B, No. 2, Feb. 1992, pp. 67–75.

*Primary Examiner*—Salvatore Cangialosi
*Attorney, Agent, or Firm*—Oliff & Berridge, PLC

[57] ABSTRACT

An overlay cellular communication network, which includes a first base station for providing a first cellular communication network having a first cell size, and a second base station for providing a second cellular communication network which covers the first cellular communication network and has a second cell size, is provided to determine a proper transmission route immediately and to cover a broad area communication network with certainty.

A mobile station belonging to an overlay communication network, which includes a micro cell having a first cell size and a macro cell having a second cell size, has an mobile station identification address in the application layer defined by the OSI reference model, and also has a plurality of addresses, each of the plurality of addresses belonging to one of the data link layer through the presentation layer defined by the OSI reference model, which represent routes to reach the mobile station. A transmitting route is determined by combining properly the mobile station identification address and the address representing a route.

20 Claims, 19 Drawing Sheets

CELLULAR COMMUNICATION NETWORK AND ITS COMMUNICATION METHOD

BACKGROUND OF THE INVENTION

1. Field of the Invention

This invention relates to a cellular communication network and its communication method, and more particularly an overlay type cellular communication network, which has a configuration in which cells having different cell sizes overlap, and its communication method. Further, this invention relates to a cellular communication network using both free space light and a radio wave as a transmission medium. Further this invention relates to a wide area communication network and a local area network (LAN). This invention also relates to a routing technology to switch transmission routes of a packet, which is responsible for information transmission.

2. Description of the Related Art

Conventionally, a cellular communication network shown in FIG. 16 is widely known. Base stations 101a through 101d provide services in cells 103a through 103d, respectively. The base stations 101a through 101d are connected each other by a wiring network or a fixed wireless network (i.e. a micro wave network having directivity) 104. The base station 101a and a mobile station 102a communicate each other by means of a radio wave. Adjacent cells uses radio waves of different frequencies for communication between the base station and the mobile station, to avoid an interference between cells. A mobile station 102b which is near a boundary between cells, negotiates with the base stations 101a and 101b in order to select a base station to be linked from the base stations 101a and 101b. This communication process is called "hand-over". This communication network is widely used for a mobile telephone or a personal handy phone system (PHS).

As an extension of the above-described cellular communication network, a cellular communication network which integrates a macro cell indicating a big size cell and a micro cell indicating a small size cell, is proposed. For instance, Japanese Laid-Open Hei. 4-506294 proposes a system shown in FIG. 16, in which a communication satellite is employed as a macro cell 202 and base stations 101a through 101d built on the earth are employed as micro cells. In this system, a mobile station 102 is linked via a radio wave 204 to one of the base stations 101a through 101d in the area having high population, and is linked via a radio wave 203 to the communication satellite 201 in an area where it is unprofitable to build a base station because of its small population.

In this specification, the structure in which the micro cell is overlaid with the macro cell is called an overlay cellular communication network. Actually, this kind of overlay cellular communication network is spontaneously generated. For instance, when a PHS network whose cell size is a few hundred meters is built in an area where a mobile telephone network whose cell size is a few kilometers has been built, an overlay cellular communication network seems to be generated. These two networks are separately managed, however, they are not enough for a well-organized overlay cellular communication network. That is, a interconnection between the macro cell and the micro cell is not considered.

A system in which base stations are wired by optical fibers and optical signals directly modulated by radio waves are distributed among the base stations, is proposed as the above-described cellular communication network (Japanese Patent Laid-Open No. Hei. 6-311083, and Arai et. al., "Dynamic rage on Fiber-Radio Microcell Radio System", Proceeding of the 1994 IEICE Spring Conference B488 (1994)). To form the cellular communication network, a system which uses free space light for communication between the base station and the mobile station, is also proposed (Japanese Patent Laid-Open No. Hei. 3-91329). A intercommunicating system rather than a cellular communication network, which distributes an optical signal directly modulated by a radio wave via an optical fiber network is also proposed (Japanese Patent Laid-Open No. Hei. 6-164498).

Meanwhile, a system which integrates light and a radio wave has been proposed for use in a remote control system (Japanese Patent Laid-Open No. Hei. 2-162846). FIG. 17 shows a configuration of the system for remote control of a machine in an invisible area. A control signal from a remote controller 111 is transmitted to a machine 114 to be controlled, via interconnection devices 112 and 113. The control signal from the remote controller 111 is at first transmitted to an optical interface 115 of the interconnection device 112 by means of a free space light beam. The interconnection device 112 converts the free space light beam signal 123 into a radio wave 124, and transmits the produced signal to the interconnection device 113. The interconnection device 113 converts the radio wave signal 124 into a free space light beam signal 125, and transmits the produced signal to the machine 114. In Fig. 17, reference numerals 116 and 117 are antennas. Reference numeral 119 is an optical interface of the machine 114. A reference numeral 121 is a room where the remote controller 111 is. A reference numeral 122 is a room where the machine 114 is. A reference numeral 120 is a wall which separates the rooms 121 and 122.

As another example for use in a remote control system, Japanese Patent Laid-Open No. Hei. 2-235447 discloses a system which uses a radio wave to transmit a signal from a mobile station to a base station (interconnection device), and uses a free space light beam to transmit a signal from the base station (interconnection device) to the mobile station.

FIG. 18 shows a network (internetwork) having a configuration which connects two networks 131 and 132 by way of an interconnection device 130. Types of the interconnection device 130 are classified into a gateway, a router, a bridge and a repeater in accordance with OSI (Open Systems Interconnection) reference model. FIG. 19 shows a diagram which associates the gateway, the router, the bridge and the repeater, to the layers of OSI reference model. It is known that the gateway, the router, the bridge and the repeater have interconnection features corresponding to the application layer, the network layer, the data link layer (in particular, MAC: the media access control layer) and the physical layer of OSI reference model, respectively. Conventionally, interconnection devices (interconnection device 130), such as a gateway, a router, a bridge or a repeater, were connected to two networks simultaneously. Meanwhile, a general terminal (133 in FIG. 18) was not connected to two networks simultaneously.

FIG. 20 schematically shows how a packet is encapsulated and decomposed. At the transmission side, a packet is transmitted from the top layer to the bottom layer, successively, of the OSI reference model, and in each layer, a header of the layer (a session header, a transport header, a network header or a data link header) is added to the packet. At the reception side, a packet is transmitted from the bottom layer to the top layer of the OSI reference model, and in each layer, a header corresponding to the layer is removed from the packet. A typical gateway relays a packet after decomposing the packet into data entities. A router relays a packet after decomposing the received packet into a packet having a network header. A bridge and a repeater relay a packet without decomposing the packet itself. The repeater relays a packet without reference to contents of the data link header, while the bridge has a feature of packet filtering, which determines whether the packet is relayed or not in accordance with a MAC (media access control) address written in the data link header. A form of the packet (which header is attached to the packet) can be used to determine which layer of OSI reference model corresponds to a process.

FIG. 20 does not show a trailer corresponding to a header, which is sometimes attached to the end of the packet. That is, a trailer (session trailer, transport trailer, network trailer or data link trailer), which corresponds to a header (session header, transport header, network header and data link header), can be attached to the packet. A data entity is sandwiched between a header and trailer to be capsulated. Since the header is indispensable, but the trailer is sometimes unnecessary, FIG. 20 does not include trailers.

Since light is an electromagnetic wave having extremely high frequency, light can carry a broadband modulated signal. But light has a disadvantage that it is easily blocked by objects. Therefore, a cellular network using free space light has a disadvantage that a cell is small. In other words, more cells are required to cover a particular area.

In the remote control system, the above-described Japanese Patent Laid-Open Hei. 2-162846 proposes a system which uses both a radio wave and light, and compensates by a radio wave for a limit of distance which free space light can reach. Since this system simply replaces a particular signal route with a radio wave, however, it is insufficient to cover the whole of a relatively wide area as a cellular network.

In a general cellular network, the above-described communication process, what is called hand-over, is a control process carried out between plural base stations and a mobile station. Accordingly, there are problems that traffic between base stations increases and each base station must have an ability of information processing such as address management.

SUMMARY OF THE INVENTION

The present invention has been made in view of the above circumstances. It is therefore an object of the invention to provide a new overlay type cellular communication network which integrates a radio wave and free space light. It is another object of the invention to realize efficient communication by providing a communication method which in a general overlay cellular communication network including a spontaneously generated overlay cellular communication network described above, make it possible to interconnect a macro cell and micro cell. To interconnect the macro cell and the micro cell in the overlay cellular communication network, there are two problems to be solved. The one is how to determine that a mobile station links which of the micro cell and the macro cell, the other is an access method from the fixed station to the mobile station.

The objects and advantages of the invention may be realized and attained by means of the instrumentalities and combinations particularly pointed out in the appended claims. To achieve the objects and in accordance with the purpose of the invention, this invention provides a cellular communication network comprising:

a mobile station which has a free space light interface, a radio wave interface and a switching unit for switching to any of the free space light interface and the radio wave interface;

at least one fixed first base station, each for communicating with the mobile station by way of a free space light in a first area;

a fixed second base station for communicating with the mobile station by way of a radio wave in a second area.

This configuration makes it possible to control problems of obstacles and to communicate surely and broadly in the second area formed by a radio wave, and to communicate at high speed in the first area formed by free space light. Further, when the second area covers the first area, it is possible to use enough high speed communication by positioning the first base station at the important position, and to cover a usual area by the communication via the second base station.

Further, the mobile station can switch not only links to the first base station and the second base station, but also links to a plurality of base stations. Accordingly, since the mobile station can have more communication opportunities, the communication capacity will increase and the reliability of the network improves.

To achieve the above-described objects, this invention also provides an overlay cellular communication network comprising: a first base station for providing a first cellular communication network of a first cell size;

a second base station for providing a second cellular communication network of a second cell size, which covers the first cellular communication network, and a mobile station which has a mobile station identification address in the application layer level defined by the OSI reference model, and a plurality of addresses indicating routes to reach the mobile station from the first base station and the second base station, each of said plurality of addresses belonging to one of the data link layer, the network layer, the transport layer, the session layer and the presentation layer defined by the OSI reference model.

DETAILED DESCRIPTION OF THE PREFERRED EMBODIMENTS

In the following, embodiments of the present invention are explained.

[Embodiment 1]

Figure 1:
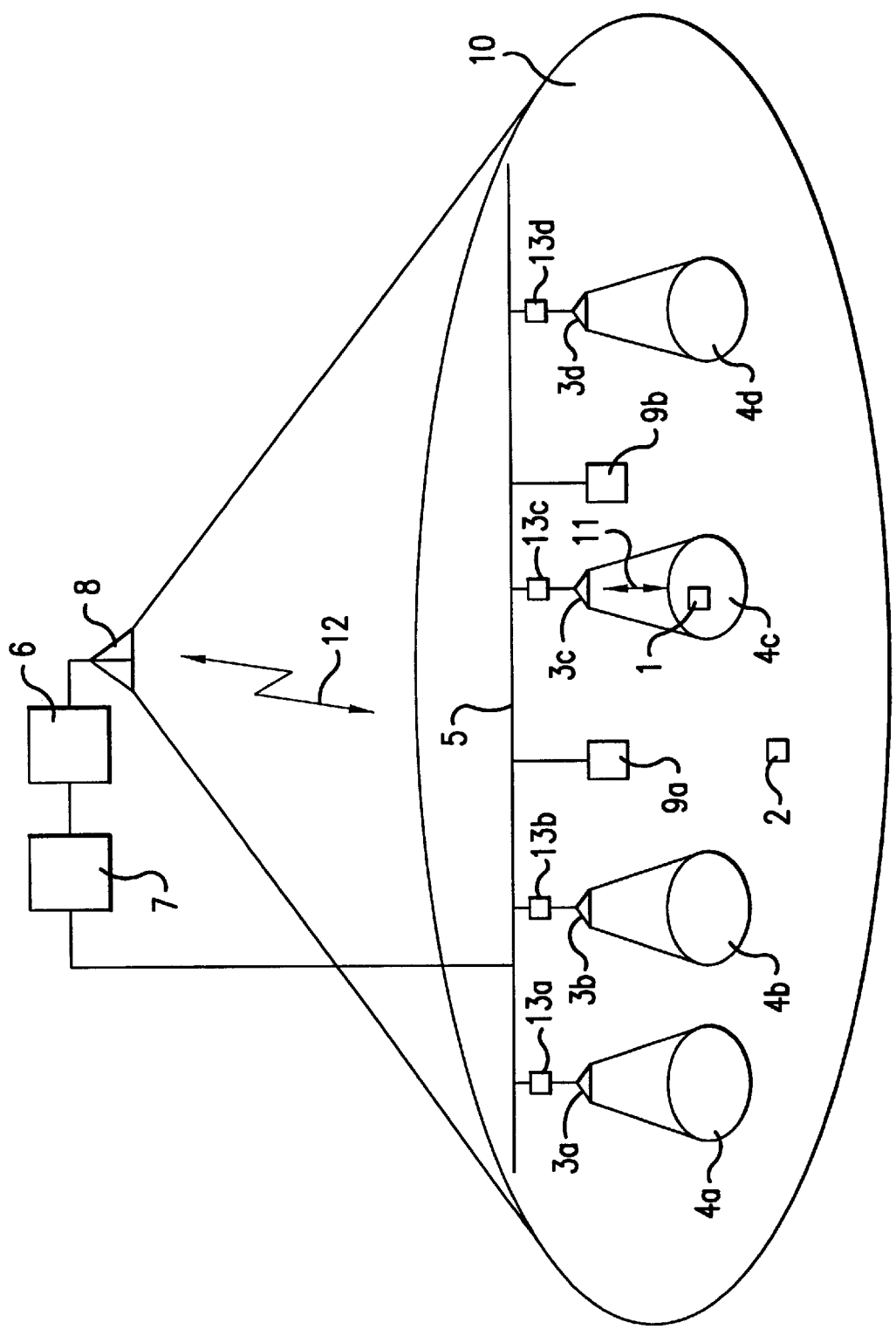
FIG. 1 is a schematic diagram illustrating a first embodiment of the present invention.

FIG. 1 shows a configuration according to a first embodiment of the present invention. This cellular network compensates by a macro cell 10 formed by using a radio wave for a blank among micro cells 4a through 4d formed by using free space light. This embodiment uses an infrared wireless LAN for the micro cell. The infrared wireless LAN employs a CSMA group protocol (i.e. CSMA/CA, CSMA/CD), which is categorized as a contention protocol, as a protocol in the data link layer. PHS-PBX (personal handy phone system private branch exchange) is employed as a macro cell 10. PHS is a well-known virtual circuit switching communication system. Base stations 3a through 3d covers the micro cells 4a through 4d, respectively. The base stations 3a through 3d are connected each other by a wiring network 5. 10BASE-T is used for the wiring network 5, which interconnects the micro cells 4a through 4d. Instead of 10BASE-T, any Ethernet group networks can be used for the wiring network 5,. Servers 9a and 9b are also connected to the wiring network 5. A base station 6 covers the macro cell 10. The base station 6 sends out a radio wave 12 from an antenna 8.

Since both the infrared wireless LAN and the PHS-PBX have been commercially available, it is easy to get them. As described above, an overlay cellular communication network, which uses an infrared wireless LAN for the micro cell and uses PHS-PBX for the macro cell, is spontaneously generated, when both the infrared wireless LAN and PHS-PBX are simply built. A hardware construction of both the infrared wireless LAN and the PHS-PBX is not enough for a well-organized overlay cellular communication network.

Each of mobile stations 1 and 2 has both an interface for a radio wave (PHS) and an interface for free space light (infrared wireless LAN), and uses one of these two interfaces by switching them in accordance with circumstances. For instance, since the mobile station 1 is in a service area of the micro cell 4c, it is linked to the micro cell base station 3c by using a free space light interface. On the other hand, since the mobile station 2 is not in service areas of micro cells, it is linked to the macro cell base station 6 by using a radio wave.

The macro cell base station 6 is connected to the wiring network 5 via a gateway 7. Therefore, a network of the macro cell 10 using radio waves is logically separated from a network consisting of micro cells 4a through 4d using free space light. This separation is caused by the large difference of a transmission rate or a medium control protocol between the PHS used for the macro cell 10 and the infrared wireless LAN used for the micro cell, that is, impossibility of direct connection near the physical layer between them. The PHS has a transmission rate around 32 Kbps and employs a protocol of a virtual circuit switching system in the data link layer, while the infrared wireless LAN has a transmission rate around 1–10 Mbps and employs CSMA protocol in the data link layer. The networks which have different characteristics, must be connected in and above the network layer, that is, by a router or a higher level interconnection device. Accordingly, the macro cell base station 6 and the wiring network 5 must be connected via a router or a gateway.

The base stations 3a through 3d are connected to the wiring network 5 via bridges 13a through 13d, respectively. If the infrared wireless LANs used for the micro cell 4a through 4d have the same transmission rate as the LAN of the wiring network 5 has, each of the base stations 3a through 3d can be connected to the wiring network 5 via a repeater.

The macro cell 10 employs PPP (Point to Point Protocol) as a protocol in the network layer. Instead of PPP, SLIP (Serial Line Internet Protocol) can be used. The micro cells 4a through 4d and the wiring network 5 employs IP (Internet Protocol) as a protocol in the network layer.

Figure 2:
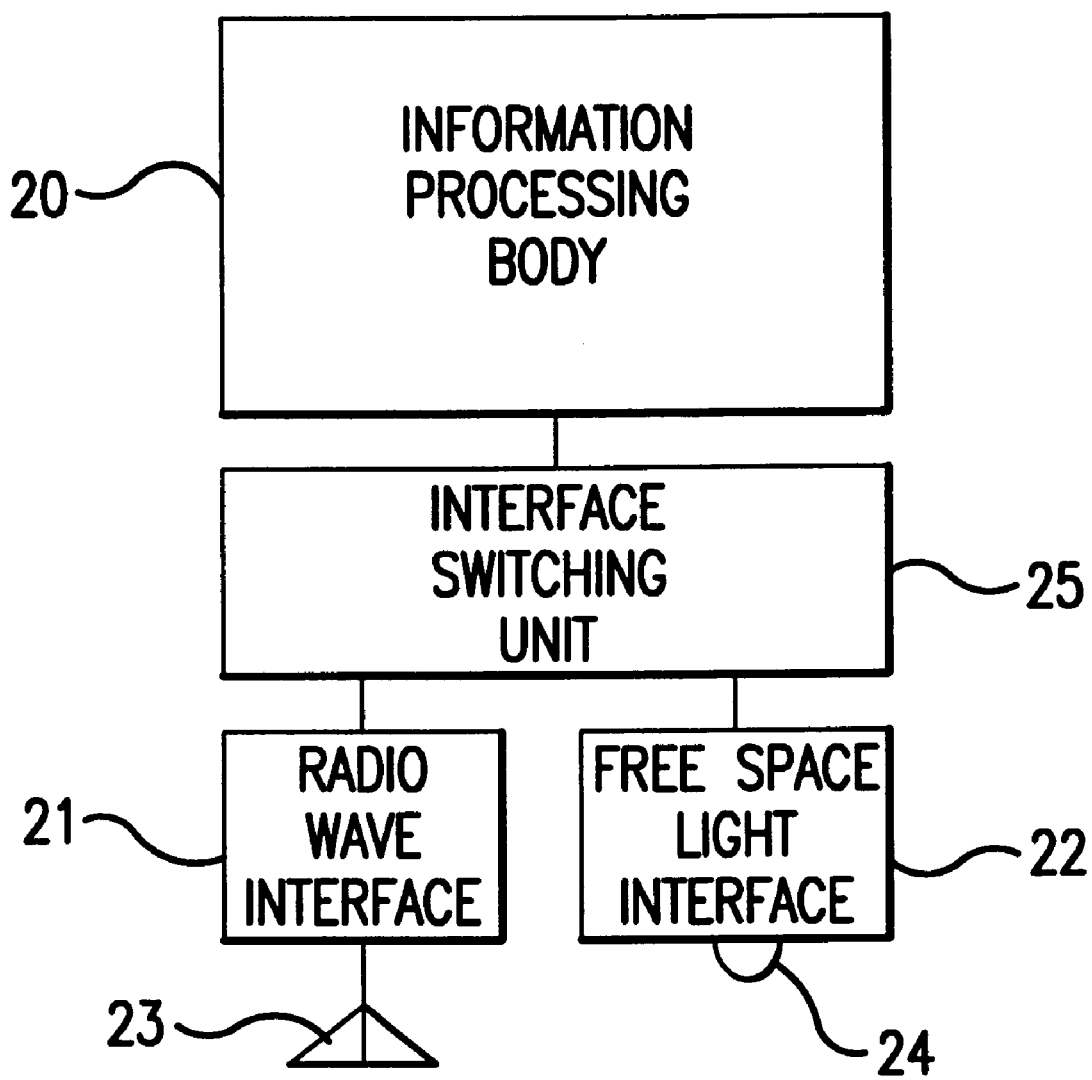
FIG. 2 is a schematic diagram illustrating a configuration of a mobile station 1 or 2 shown in FIG. 1.

FIG. 2 shows a configuration of the mobile station 1 or 2. Each of the mobile stations 1 and 2 is provided with an information processing body 20 like a computer, an interface 21 for a radio wave (PHS), an interface 22 for free space light (infrared wireless LAN), and an interface switching unit 25 for switching the two interfaces. The interface 21 for a radio wave (PHS) has an antenna 23, while the interface 22 for free space light (infrared wireless LAN) has an optical unit 24 like a lens. The interface switching unit 25 has not only a signal switching feature but also a protocol switching feature corresponding to the selected interface. As described above, in this embodiment, since the micro cell and the macro cell are the logically separated networks, an IP address used when the mobile station is linked to the macro cell base station is different from an IP address used when the mobile station is connected to the micro cell base station. That is, the mobile station has a kind of routing feature.

The network side (server or base station) sees the mobile station with two IP addresses. These two addresses can be regarded as addresses indicating routes to reach the mobile station. As described later, one of the characteristics of this invention is that the address of the mobile station itself is provided besides the addresses of indicating routes. Notice that the address of a path changes when the mobile station moves.

Figure 3:
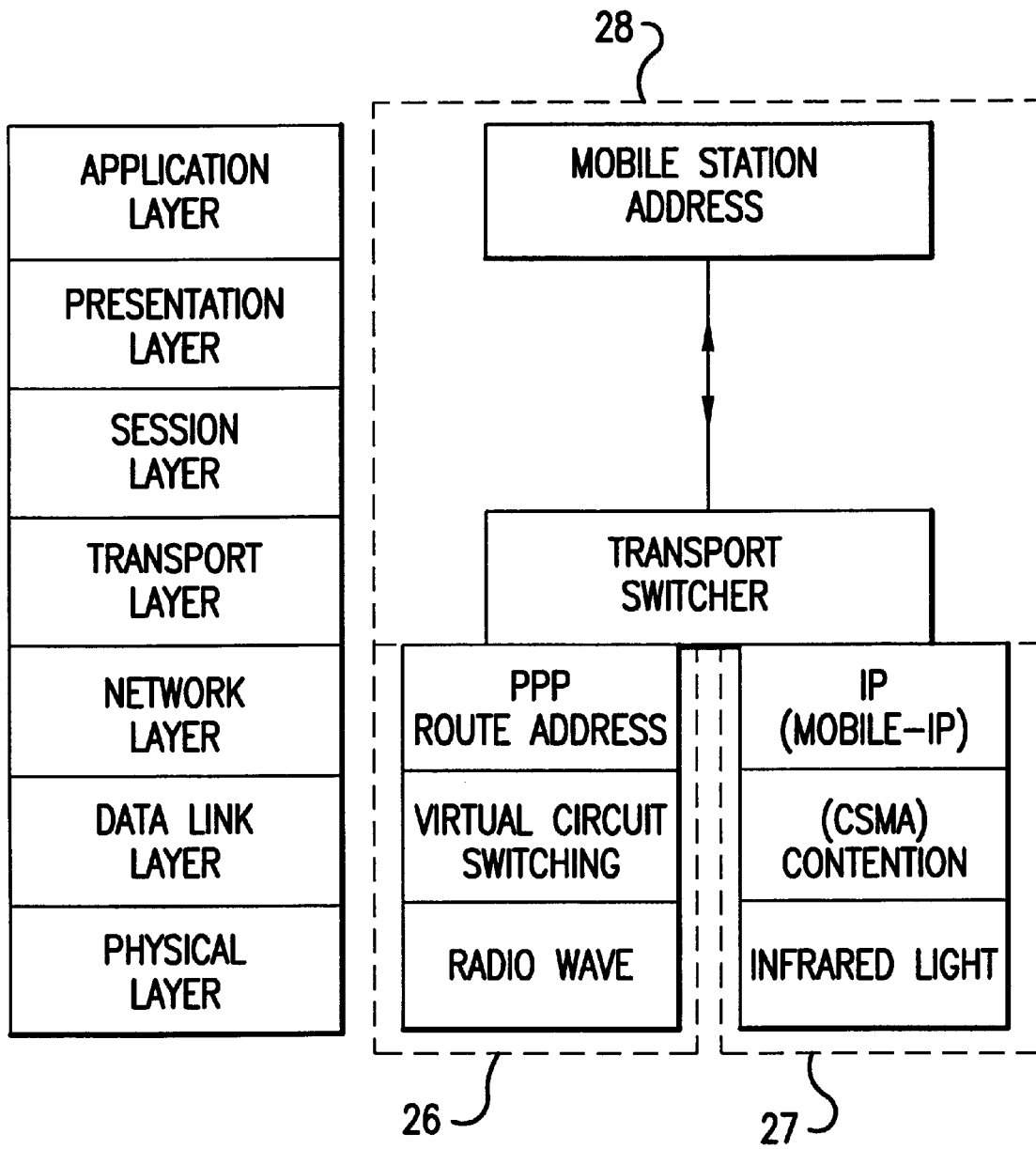
FIG. 3 is a schematic diagram illustrating an allotment of functions to each compositional element shown in FIG. 2.

FIG. 3 shows configuration of features among the interface 21 for a radio wave (PHS), the interface 22 for free space light (infrared wireless LAN) and the interface switching unit 25 in accordance with the OSI reference model in a communication system of the present invention. The interface 21 for a radio wave (PHS) supplies functions 26 in the physical layer, the data link layer and the network layer for PHS. The interface 22 for free space light (infrared wireless LAN) supplies functions 27 in the physical layer, the data link layer and the network layer for the infrared wireless LAN. The interface switching unit 25 supplies functions 28 which include a whole function from the transport layer to the application layer. The functions 28 receive an information entity to be transmitted, from the information processing body 20, add an application header including an address in the application layer level to the information entity to create a packet, and send the packet to the transport layer. The transport layer carries out software processing for switching two networks. That is, when the packet is sent to the interface 21 for the PHS (radio wave), a header including an IP address corresponding to the PPP to the packet. When the packet is sent to the interface 22 for the free space light (infrared wireless LAN), a different IP address is added to the packet. The interface 22 for the free space light (infrared wireless LAN) can use a mobile-IP instead of IP in the network layer. Since the mobile-IP is a protocol suitable for mobile clients, the better control can be conducted by using it.

Figure 4:
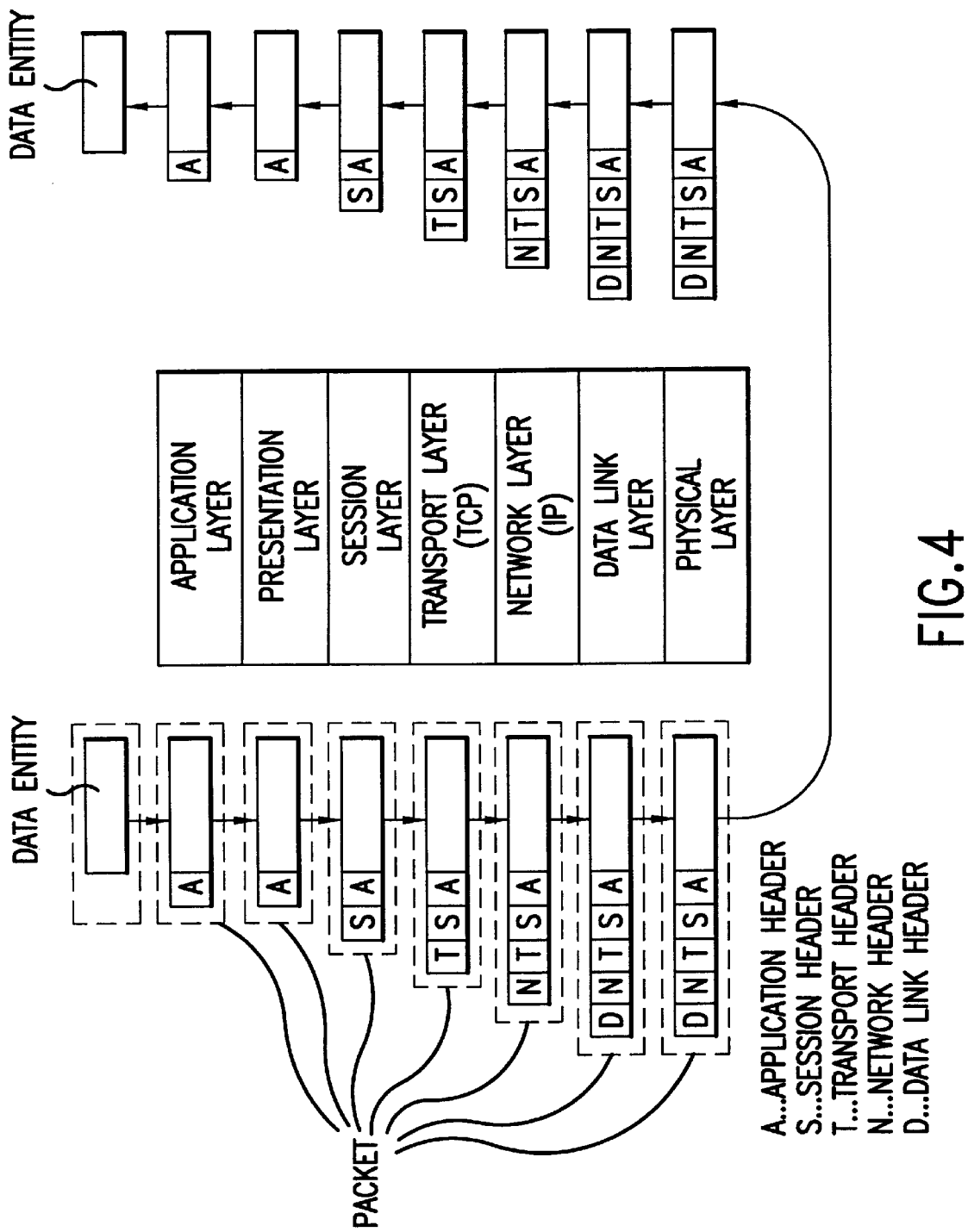
FIG. 4 is a schematic diagram illustrating encapsulation and decomposition of a packet in accordance with the present invention.
Figure 20:
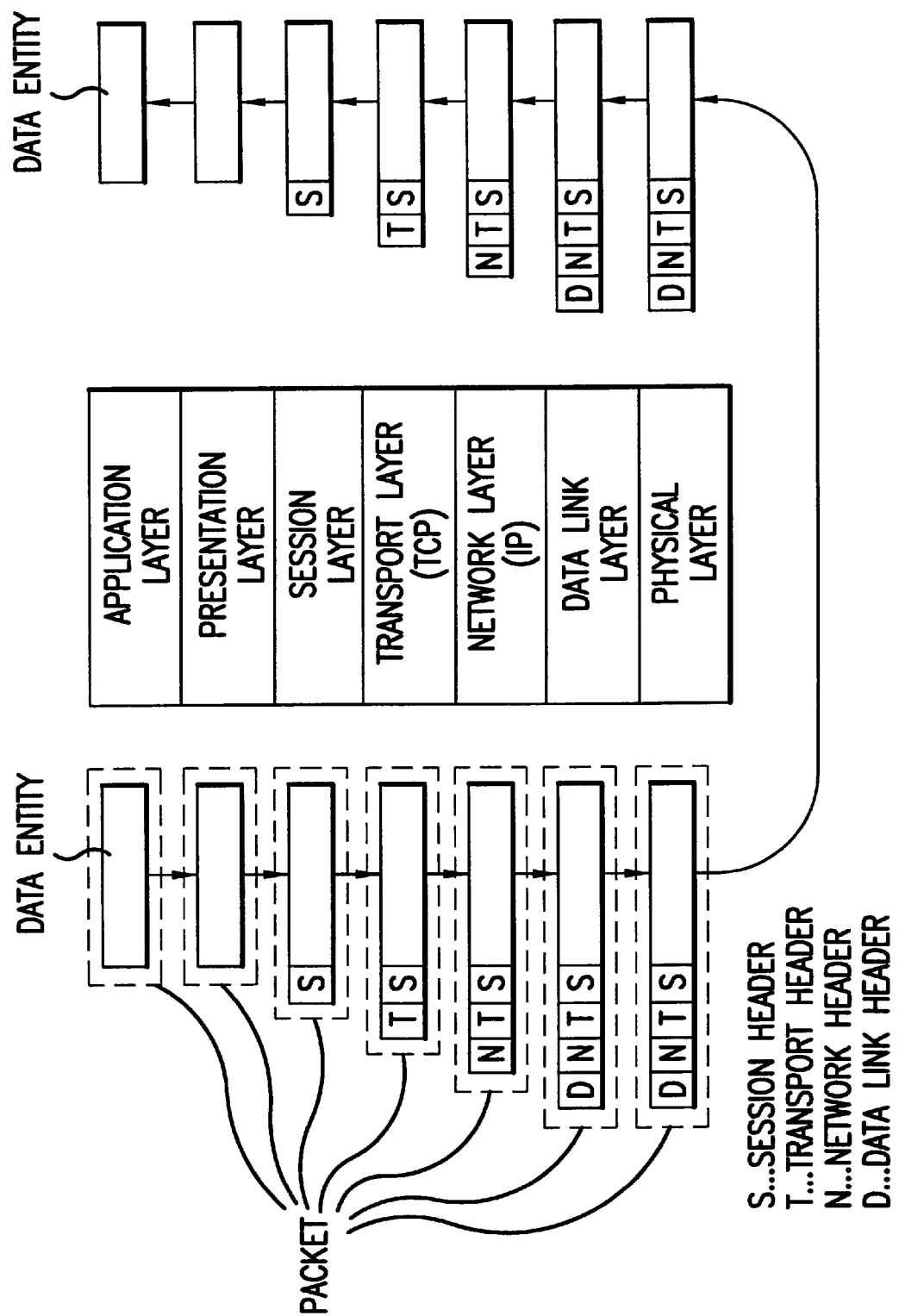
FIG. 20 is a schematic diagram illustrating a construction and decomposition of a packet in accordance with OSI reference model.

FIG. 4 schematically shows an encapsulation and decomposition of a packet capsule conducted by the interface switching unit 25 to switch to one of the radio wave and the infrared optical wireless LAN. The difference between this embodiment and FIG. 20 is that an application header is attached in the application layer. An application layer level address indicating a mobile station, is written in the application header.

Conventionally, the function to switch routes of a packet was supplied by a particular server like a router, which connects two networks. However, there is no conventional technique in that an client (mobile station) supplies the function to switch routes of a packet, as this embodiment.

That is, in this invention, a mobile station is provided with a packet switching feature, what is called a routing function, and determines to link to one of the micro cell and the macro cell.

The functions in the network layer and the transport layer can be supplied by the information processing body 20. This method makes the hardware simple, but increases a burden of the software required for the information processing body 20.

Figure 5:
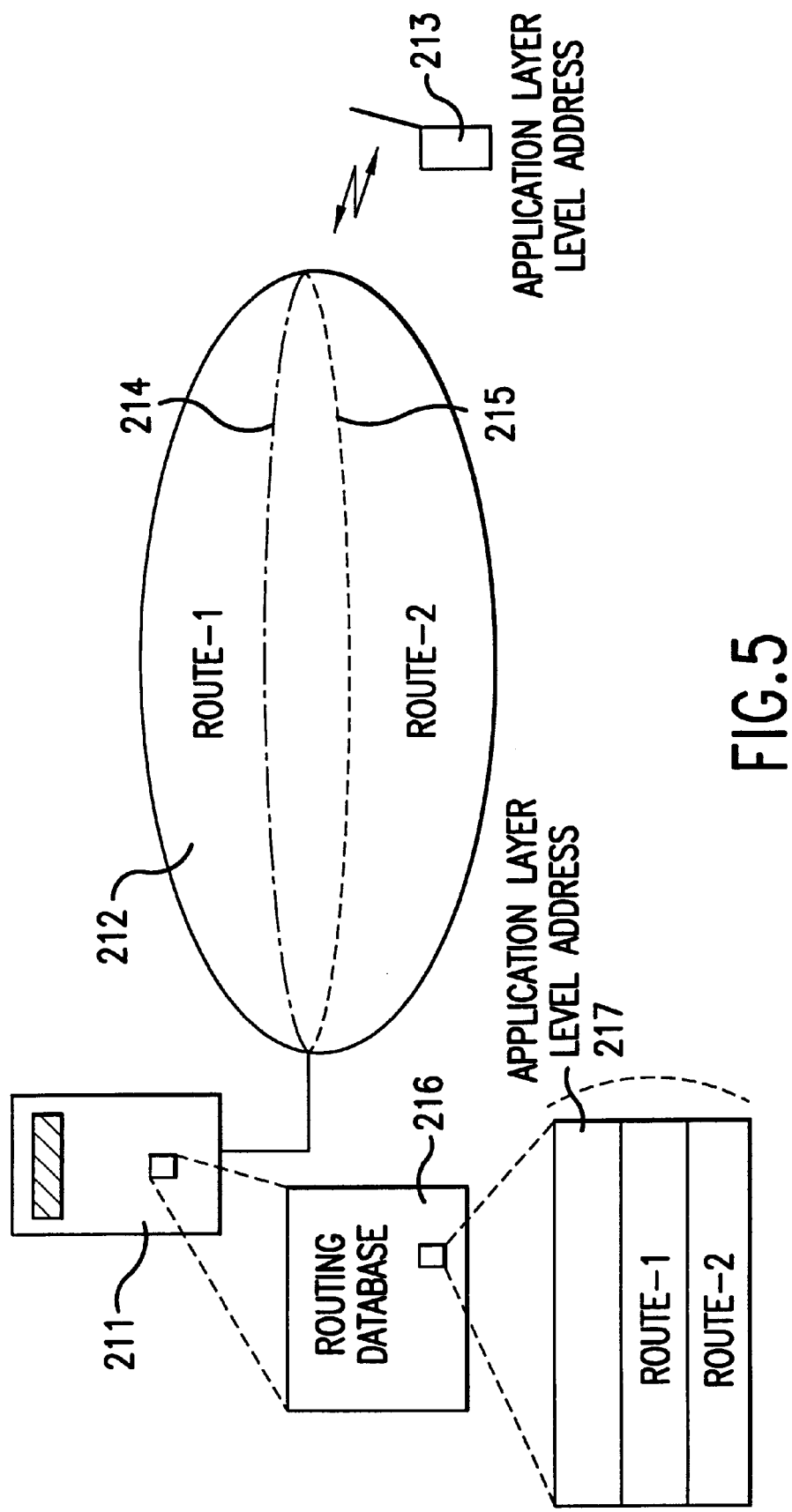
FIG. 5 is a schematic diagram illustrating an access from a server to a mobile station in accordance with the present invention.

As described above, this embodiment gives a unique application layer level address to a mobile station, and regards a network layer level address (IP address in this embodiment) as an address indicating a route. Therefore, as shown in FIG. 5, a server 211 accesses to a mobile station 213 in accordance with the application layer level address. In FIG. 5, there are two routes in the network 212 from the server 211 to the mobile station 213, that is, route-1 of reference numeral 214 and route-2 of reference numeral 215. The server 211 is usually a fixed station. The server 211 has a routing database 216, which includes, for example, information of a record file 217. The record file 217 associates an application layer level address with two routes (IP addresses, for example).

The information in the routing database is properly updated in accordance with a movement of the mobile station. A protocol of the known mobile-IP or the virtual-IP can be used for the procedure of the update. In these procedures, each mobile station is given a domicile address, and the mobile station informs the domicile address of a current position, when the mobile station can communicate. Here, the domicile address means a server which is responsible for address management. When a server which will access to a mobile station does not know a current position of the mobile station, the server gets the current position, more precisely, a routing information to get to the mobile station by inquiring of the domicile address (the server responsible for address management).

FIG. 5 shows routing management conducted by the server 211. All servers do not required to have such a function, however. It is possible to determine a server which executes the routing management of mobile stations, and other general servers can depute routing management to the server which executes the routing management. A proxy server, which executes a particular service for the other servers, is well-known to people skilled in the art.

The application layer level address can be anything unique to a mobile station. It is possible to use something in a form easily understood by people, such as an e-mail address or a URL in http, as well as a simple serial number, such as telephone number. It is also possible to use IP address system or Ethernet address system as the application layer level addresses. IP address or Ethernet address defines a unique address in the whole world. The use of the existing address system has an advantage that it is not required to set up, maintain and manage a new address system. However, it should be noticed that it has a risk of confusing the routing in the network. Therefore, it is rather preferable that the application layer level address system is defined as an extension of the e-mail address or URL.

[Embodiment 2]

Figure 6:
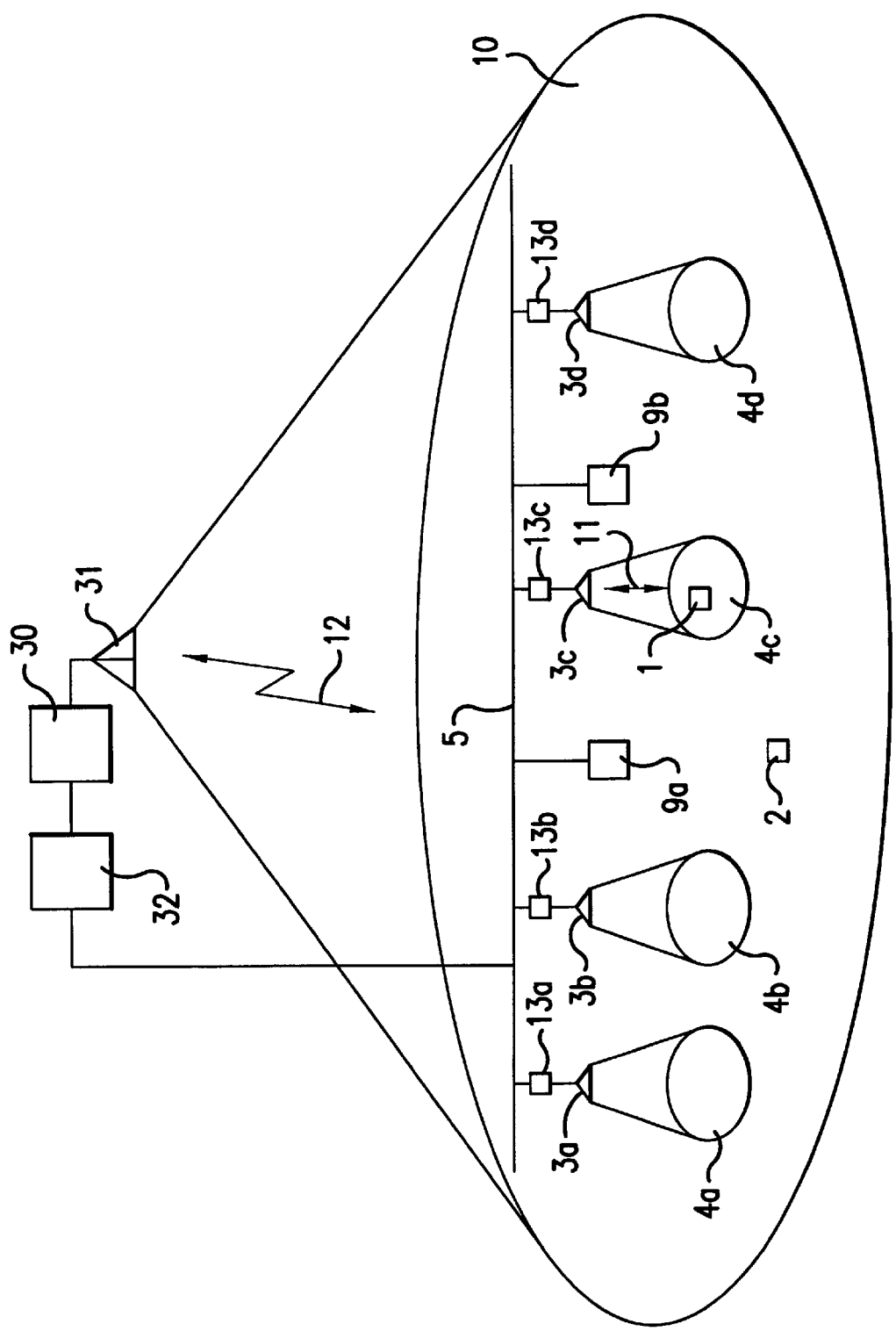
FIG. 6 is a schematic diagram illustrating a second embodiment of the present invention.

FIG. 6 shows a configuration according to a second embodiment of the present invention. There are two differences between this embodiment and the first embodiment shown in FIG. 1. One of them is that a wireless base station 30 provided with an antenna 31 is a wireless LAN using a radio wave. To be concrete, a wireless LAN of a spread spectrum system using ISM band (Industry Science Medical frequency band: A band of 2.5 GHz in Japan) is used. Since the frequency is different from that of the PHS (1.9 GHz band), the antenna 31 is different from the antenna 6. The other difference from the first embodiment shown in FIG. 1 is that a bridge 32 is used, instead of the gateway 7.

A wireless LAN of a spread spectrum system using ISM band uses a CSMA/CA system for a protocol in the data link layer. This protocol is the same as the protocol in the data link layer which the infrared wireless LAN of the micro cells 4a through 4d uses. Further, the CSMA/CA protocol is very similar to CSMA/CD, which is employed as a protocol of the data link layer in the wiring network 5.

Compared to the first embodiment, since this embodiment connects a macro cell using a radio wave to a micro cell using free space light in a lower layer of the OSI reference model, there is a merit that both a hardware and a software of the network configuration become simple. Further, the second embodiment has another merit that a relay of a packet between the macro cell and the micro cell is faster than that of the first embodiment, which uses a gateway as an interconnection device.

Figure 7:
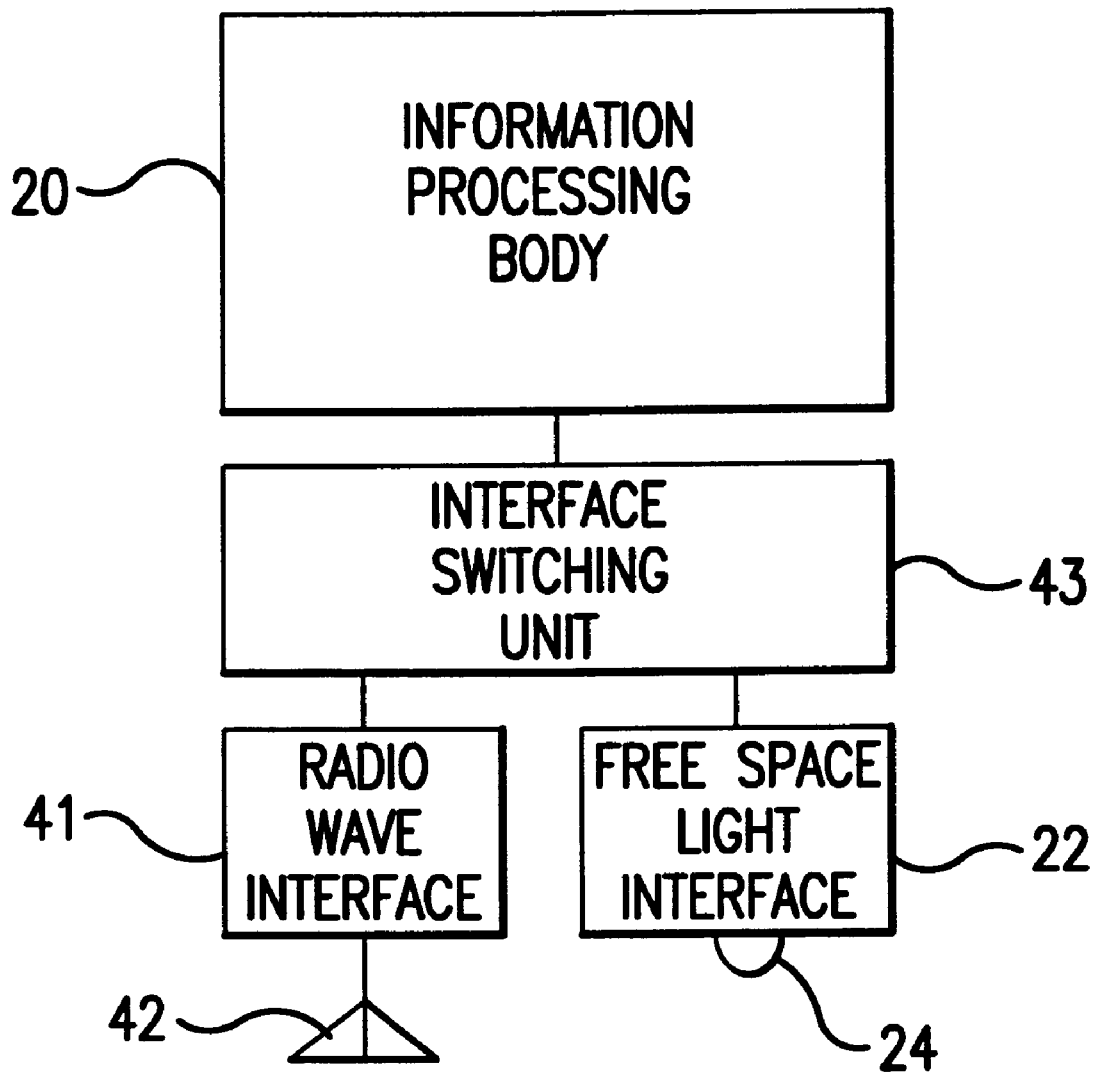
FIG. 7 is a schematic diagram illustrating a configuration of a mobile station 1 or 2 shown in FIG. 6.

FIG. 7 shows a configuration of the mobile station 1 or 2. The mobile station has an interface 41 of a radio wave (spread spectrum system wireless LAN), an interface 22 of free space light (infrared wireless LAN) and a interface switching unit 43 for switching the two interfaces.

Figure 8:
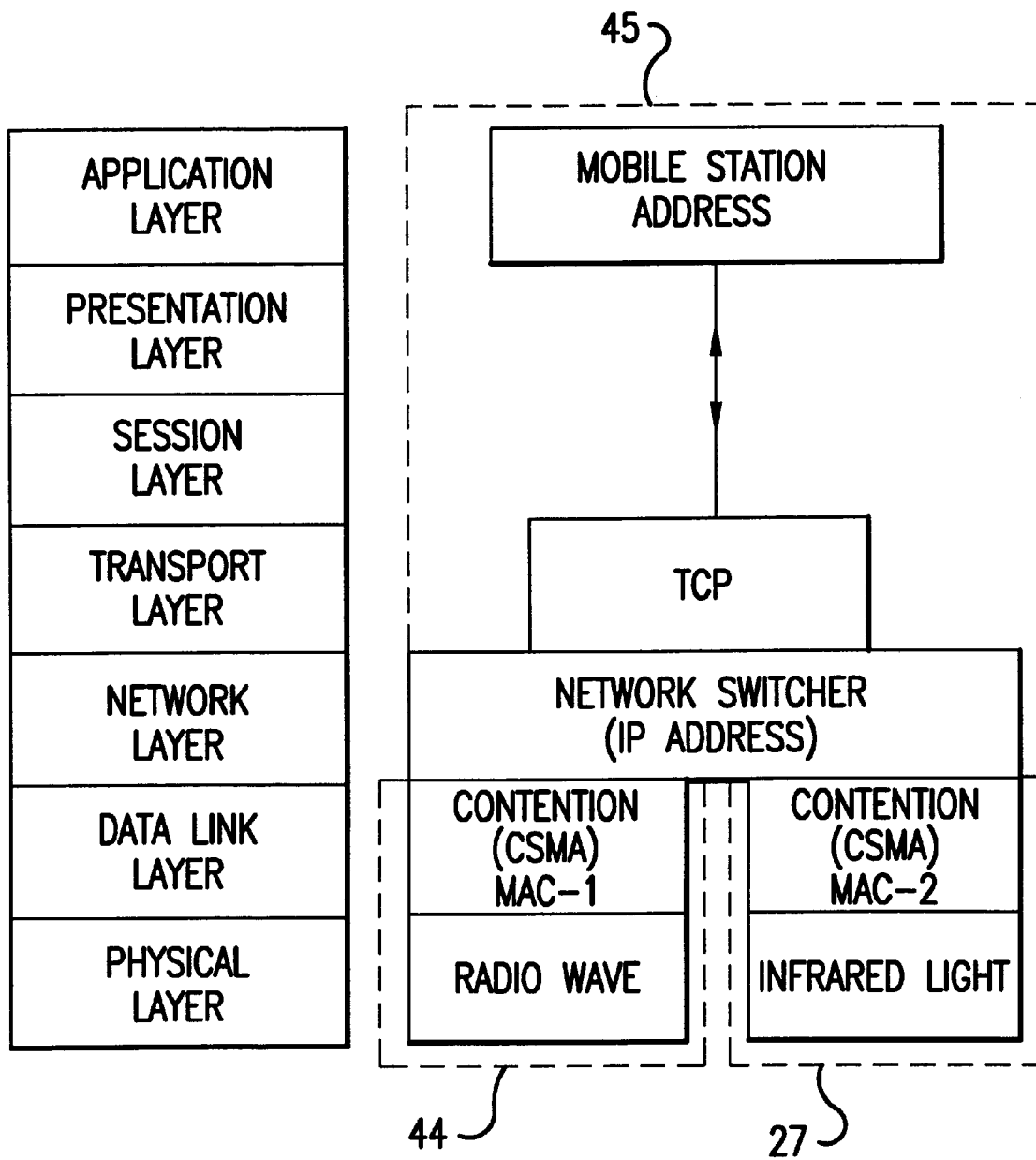
FIG. 8 is a schematic diagram illustrating an allotment of functions to each compositional element shown in FIG. 7.

FIG. 8 shows a configuration of features among the interface 41 for a radio wave (spread spectrum wireless LAN), the interface 22 for free space light (infrared wireless LAN) and the interface switching unit 43 in accordance with the OSI reference model. The interface 41 for a radio wave (spread spectrum wireless LAN) supplies functions 44 in the physical layer and the data link layer for the spread spectrum wireless LAN, while the interface 22 for free space light (infrared wireless LAN) supplies functions 27 in the physical layer and the data link layer for the infrared wireless LAN. The interface switching unit 43 supplies functions 45 from the network layer to the application layer. The functions 45 is realized by software processing for switching two networks in the network layer rather than the transport layer in the first embodiment. This is the difference between the functions 28 in the first embodiment and the functions 45.

A communication system of this embodiment is characterized by switching routes of a packet in the network layer, as shown in FIG. 8. In the communication system of the first embodiment shown in FIG. 3, the mobile station has two network layer level addresses (IP addresses). In this embodiment, as shown in FIG. 8, the mobile station 2 has an IP address, and two media access control addresses (MAC), that is MAC-1 and MAC-2. This is the difference between the first embodiment and this embodiment. To be concrete, the media access control address is an Ethernet address. This embodiment executes routing control of packets in accordance with an application layer level address unique to the mobile station as the first embodiment does.

Since this embodiment manages a communication route in the network layer, TCP, which is a connection type protocol, can be used for a protocol in the transport layer. Because TCP establishes a connection with a communication partner, it is easy for the network to fall into a state, what is called hang-up, when a line is suddenly closed. In this embodiment, when a communication channel for infrared light is suddenly closed, a network switcher tries to switch to the communication channel for a radio wave. Therefore, a risk of falling into the state of hang-up can be decreased. There is much merit in keeping compatibility with TCP, since TCP is practically the standard of internet.

[Embodiment 3]

Figure 9:
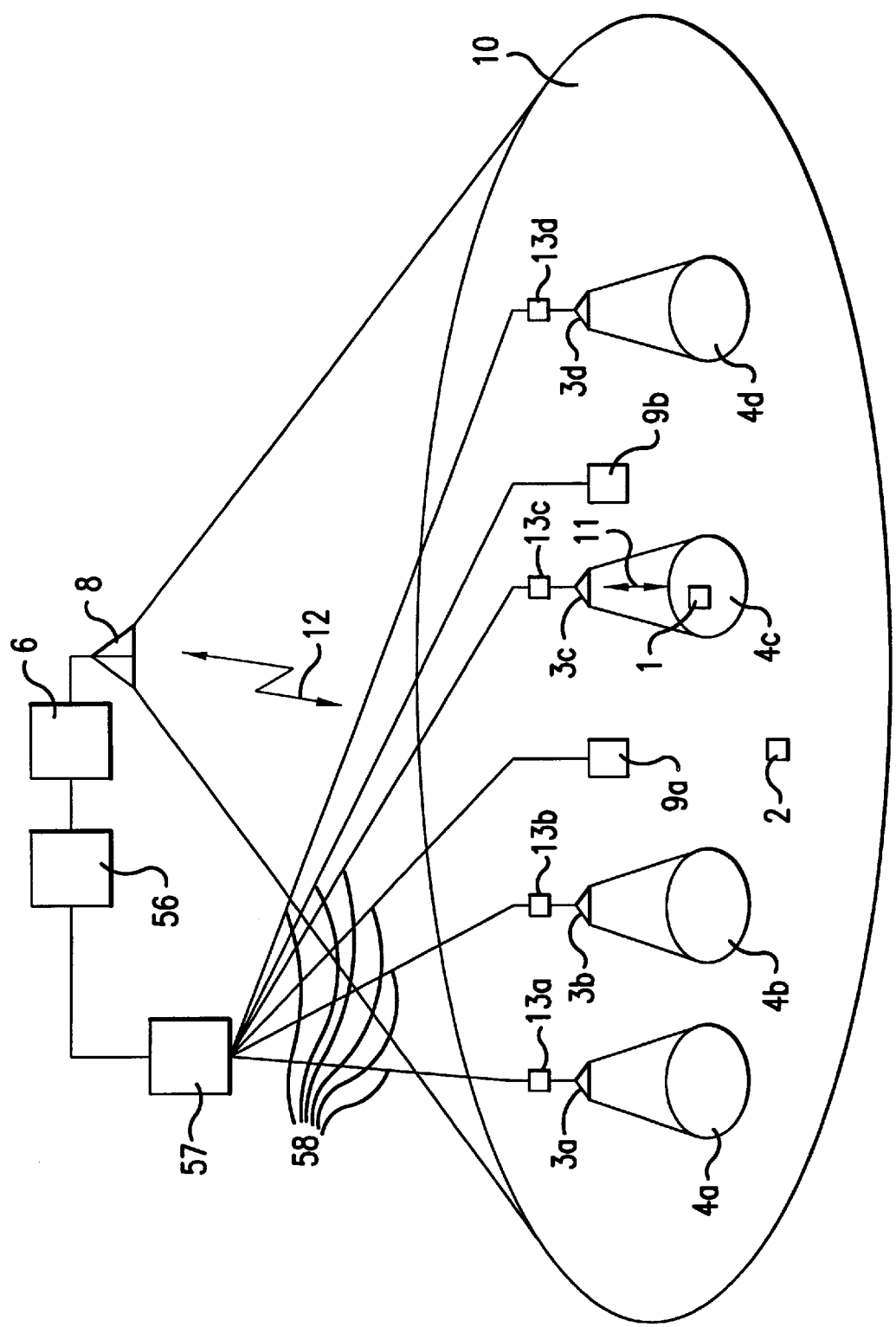
FIG. 9 is a schematic diagram illustrating a third embodiment of the present invention.

FIG. 9 shows a configuration according to a third embodiment of the present invention. This embodiment uses an infrared wireless LAN for each of the micro cells 4a through 4d, and a PHS-PBX (Personal Handy Phone System Private phone Branch Exchange) 6 as a macro cell 10. It is also the same as the first embodiment in that infrared wireless LANs of the micro cells are connected to the ATM-LAN 68 via bridges 13a through 13d.

This embodiment is different from the first embodiment in that the micro cells 4a through 4d and servers 9a and 9b constitutes a network by using ATM-LAN. To be concrete, ATM-25, which has a transmission rate of 25 Mbps is employed as ATMLAN. The micro cells 4a through 4d are connected to the ATM exchanger 57 via bridges 13a through 13d and wiring networks 58. The servers 9a and 9b are connected to the ATM exchanger via wiring networks. That is, this configuration is constructed by replacing the wiring network 5 formed by 10BASE-T in the first embodiment with ATM-LAN. A physical medium of the wiring networks 42 is a twisted pair cable. An optical fiber can be used for a physical medium of the wiring network instead.

The ATM-LAN is connected to the PHS-PBX 6 via gateway 41. The gateway, however, can be replaced with a router or a bridge. Since both the ATM-LAN and PHS follows a virtual circuit switching protocol in the data link layer, they can be connected in the data link layer, in principle. But actually it is sometimes difficult to connect the ATM-LAN to the PHS in the data link layer, because their transmission rates are extremely different.

In this embodiment, a reservation for transmission capacity can be made all aver the transmission line as far as the micro cells are not used in transmission. This is caused by the reason that, as mentioned above, both the ATM-LAN and the PHS follows a virtual circuit switching protocol in the data link layer. Therefore, it is preferable that signals which requires real time processing, like sound or image, are not transmitted via micro cells, to keep continuity of the signals. Accordingly, this embodiment can adopt a control process that signals which requires real time processing, like sound or image, are transmitted via a macro cell, even if a mobile station is in a micro cell (see FIGS. 10 and 11).

Figure 10:
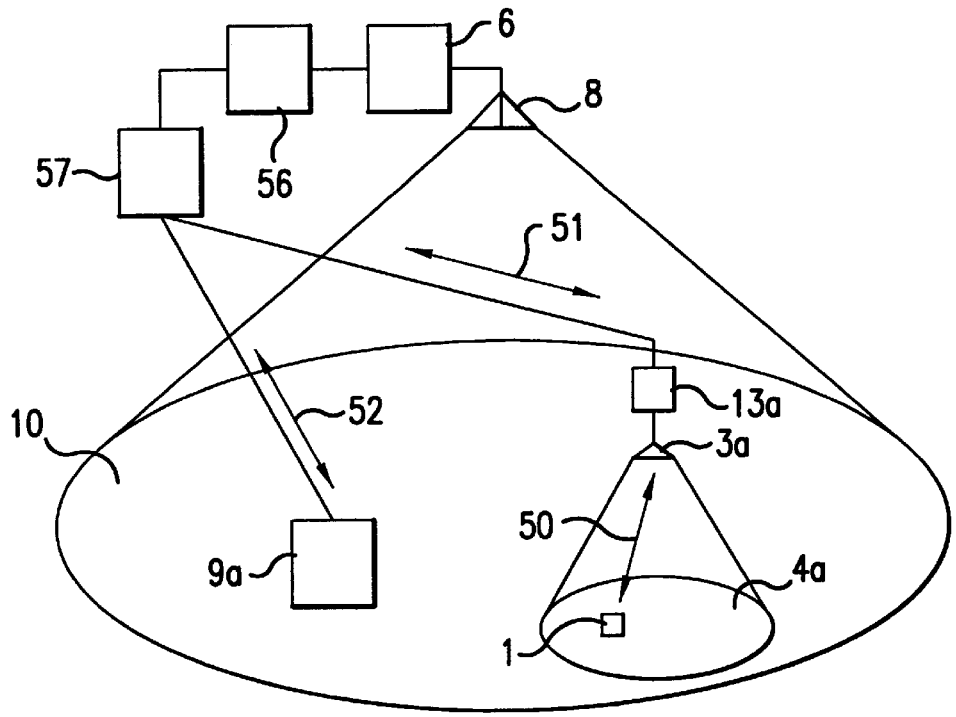
FIG. 10 is a schematic diagram illustrating a route of a usual data communication in FIG. 9.

FIG. 10 shows a route of a signal used in a usual data communication. When the mobile station 1 is in the micro cell 4a, a usual data communication packet, which does not require real time processing, is exchanged between the mobile station 1 and the server 9a via the infrared wireless LAN base station 3a, the bridge 13a and the ATM exchanger 57. That is, the usual data communication packet, which does not require real time processing, is exchanged between the mobile station 1 and the server 9a via a path consisting of routes 50, 51 and 52.

Figure 11:
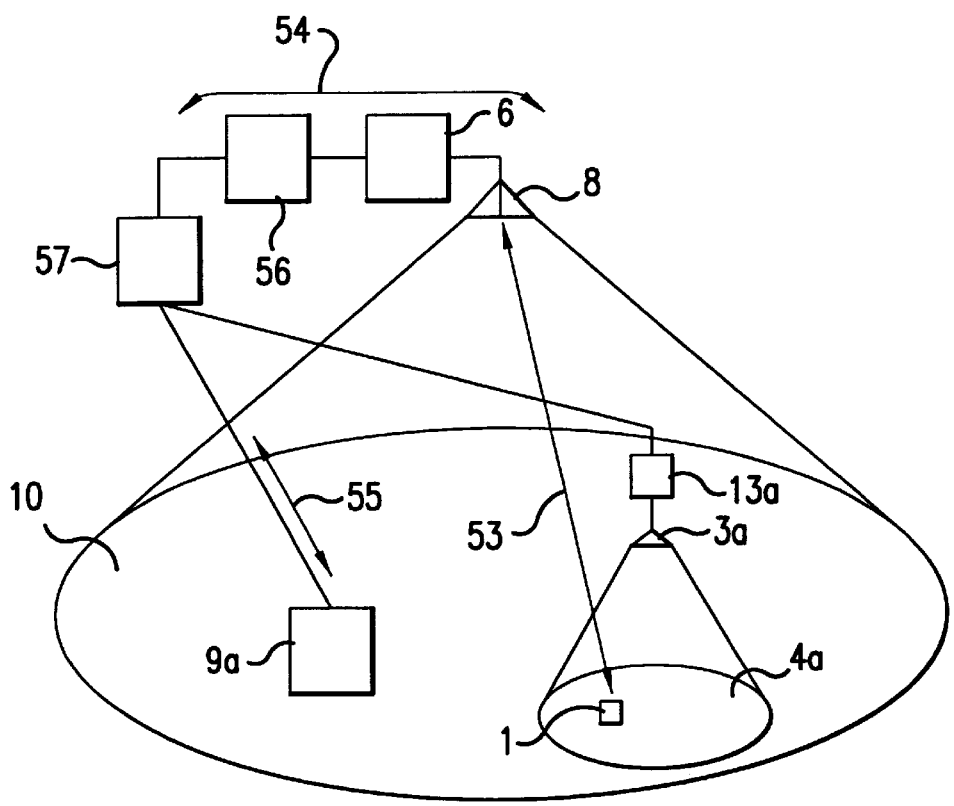
FIG. 11 is a schematic diagram illustrating a route of a signal which requires real time communication (such as sound or image)

FIG. 11 shows a route for transmitting a signal which requires real time processing, like sound or image. When the mobile station 1 is in the micro cell 4a, a signal which requires real time processing is exchanged between the mobile station 1 and the server 9a via the PHS exchanger 6, the gateway 56 and the ATM exchanger 57. That is, the signal which requires real time processing, exchanged between the mobile station 1 and the server 9a via a path consisting of routes 53, 54 and 55.

Figure 12:
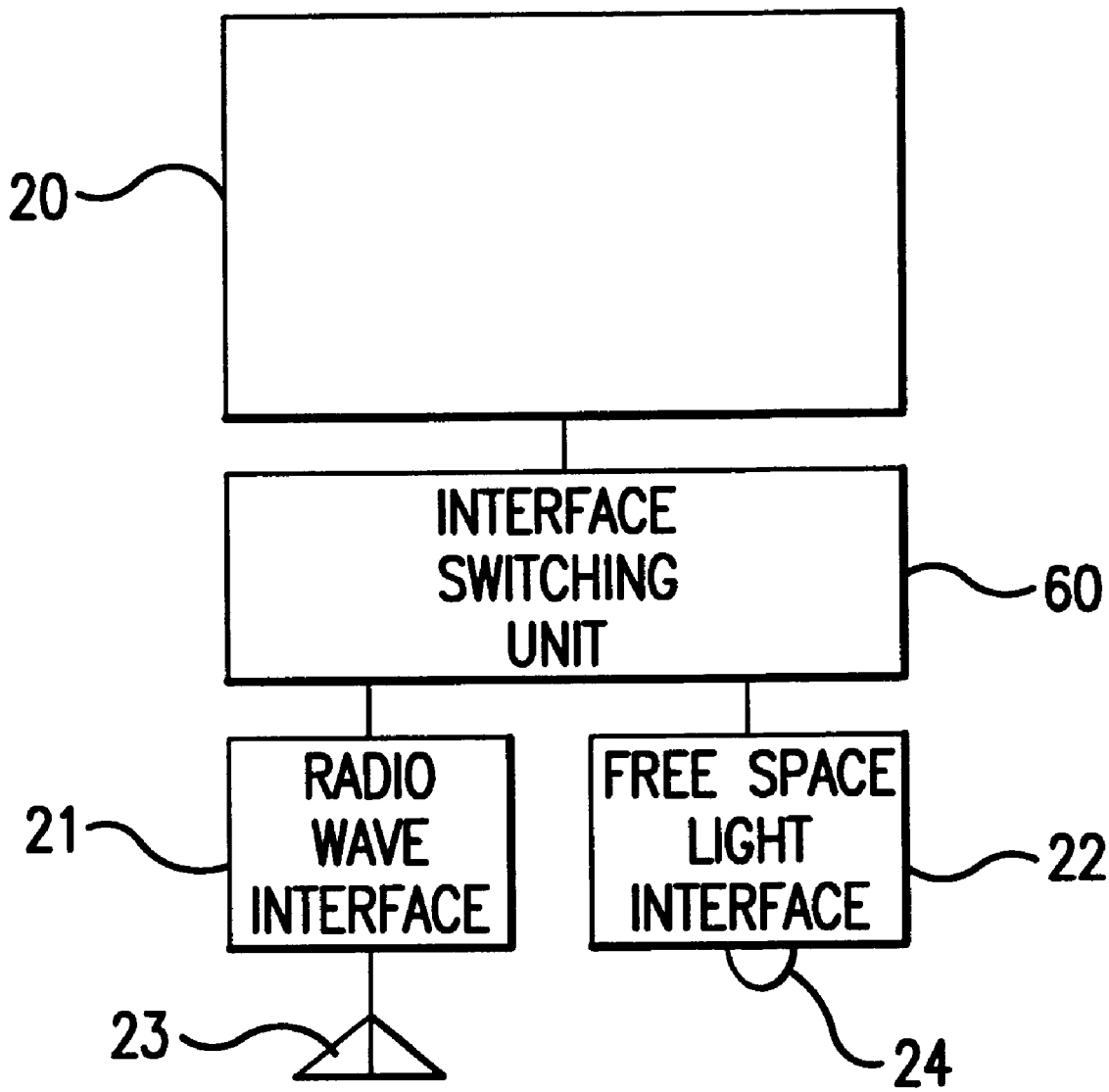
FIG. 12 a schematic diagram illustrating a configuration of a mobile station 1 shown in FIG. 9.

FIG. 12 shows a configuration of the mobile station 1. This configuration is almost the same as the configuration shown in FIG. 2. However, the structure of the interface switching unit 60 is different from that of the first embodiment. This difference mainly appears in software.

Figure 13:
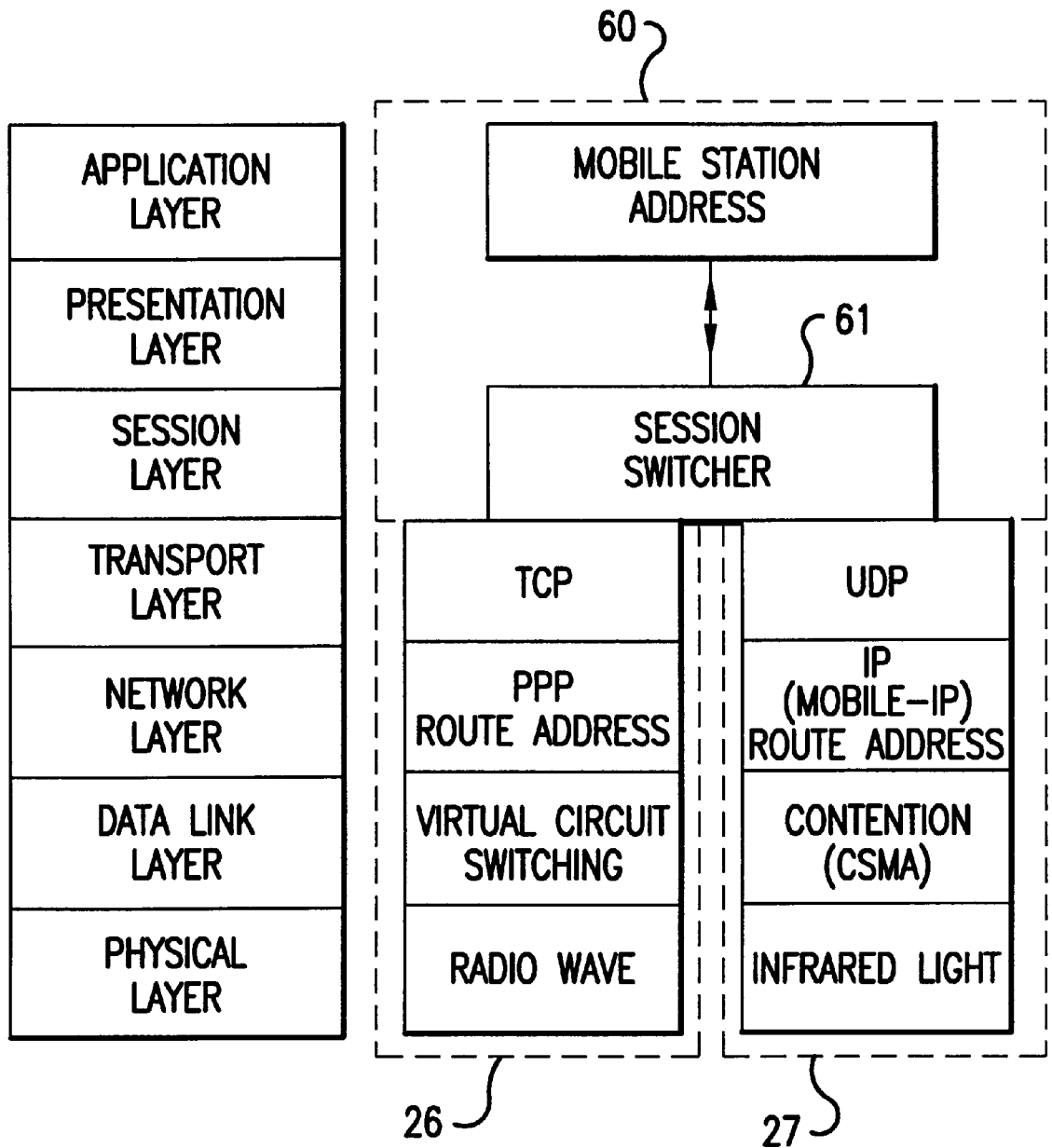
FIG. 13 is a schematic diagram illustrating an assignment of functions to each compositional element shown in FIG. 12.

FIG. 13 shows an configuration of functions among the interface 21 for a radio wave (PHS), the interface 22 for free space light (infrared wireless LAN) and the interface switching unit 60 in accordance with the OSI reference model, in a communication system of the present invention. A function 26 of the interface 21 for a radio wave (PHS) and a function 27 of the interface 22 for free space light (infrared wireless LAN) are the same as those of FIG. 3. A function 61 of the interface switching unit 60 is different from the function 28 in FIG. 3. The function 61 is realized by software processing which switches two networks in the session layer. The UDP is employed as a protocol in the transport layer for the free space light (infrared wireless LAN) channel. The UDP is different from the TCP in that it is a connectionless type protocol.

In this embodiment as well as the first embodiment, the mobile station has two network layer level addresses (IP addresses). There are naturally two types of headers which identify sessions in the session layer level. An identifier to identify a session, like a header, is not usually called an address but a session name, because a conventional internetworking assumes that interconnection among networks is soaked up in the transport layer level.

Communication sessions must be switched between the communication for a packet used only in data communication and the communication including a signal which requires real time processing, like audio or video signals. Generally, a function for switching routes of a packet in accordance with contents of the packet (data communication packet or audio packet), is not supplied in and below the transport layer. Then, a route must be selected in the higher layer, such as the session layer.

In the above described configuration, since sound and image, which requires real time processing, are transmitted by using a transmission line which ensures real time processing, quality of communication services improves.

When a mobile station moves, a transmission channel via a micro cell (free space light) has a higher risk of disconnection than that of a macro cell. Therefore this embodiment employs UDP, which is a connectionless type protocol, as a protocol of the transport layer for a transmission channel of free space light. The UDP has a merit that it has a lower risk of so-called hang-up than TCP has.

Further, it is possible to use a communication control procedure in that a mobile station detects movement thereof and select a communication route in accordance with the result of detection. For instance, when the mobile station moves frequently, a communication route via the macro cell is selected. When the mobile station does not move, a communication route via the micro cell is selected. This communication control can make the user satisfying in less communication cutoff.

While the network switching is conducted in the session layer in FIG. 13, it can be conducted in the higher layer. FIG. 13 mainly shows that when a signal which requires real time processing and a signal which does not require a real time processing exist together in the network configuration shown in FIG. 12, the network switching must be conducted in or above the session layer.

While the embodiment describes a case having two transmission channels, that is, free space light and a radio wave, it is obvious for the expert in this art that the embodiment can be extended to a case having three or more transmission channels in the communication system of the present invention. That is, three or more routes rather than two, can be supplied under a network switcher, a transport switcher or a session switcher.

When a mobile station has more than two transmission channels, there are naturally more than two addresses indicating routes. That is, a mobile station having more than two transmission channels is provided with more than two media access control addresses and IP addresses.

[Embodiment 4]

Figure 14:
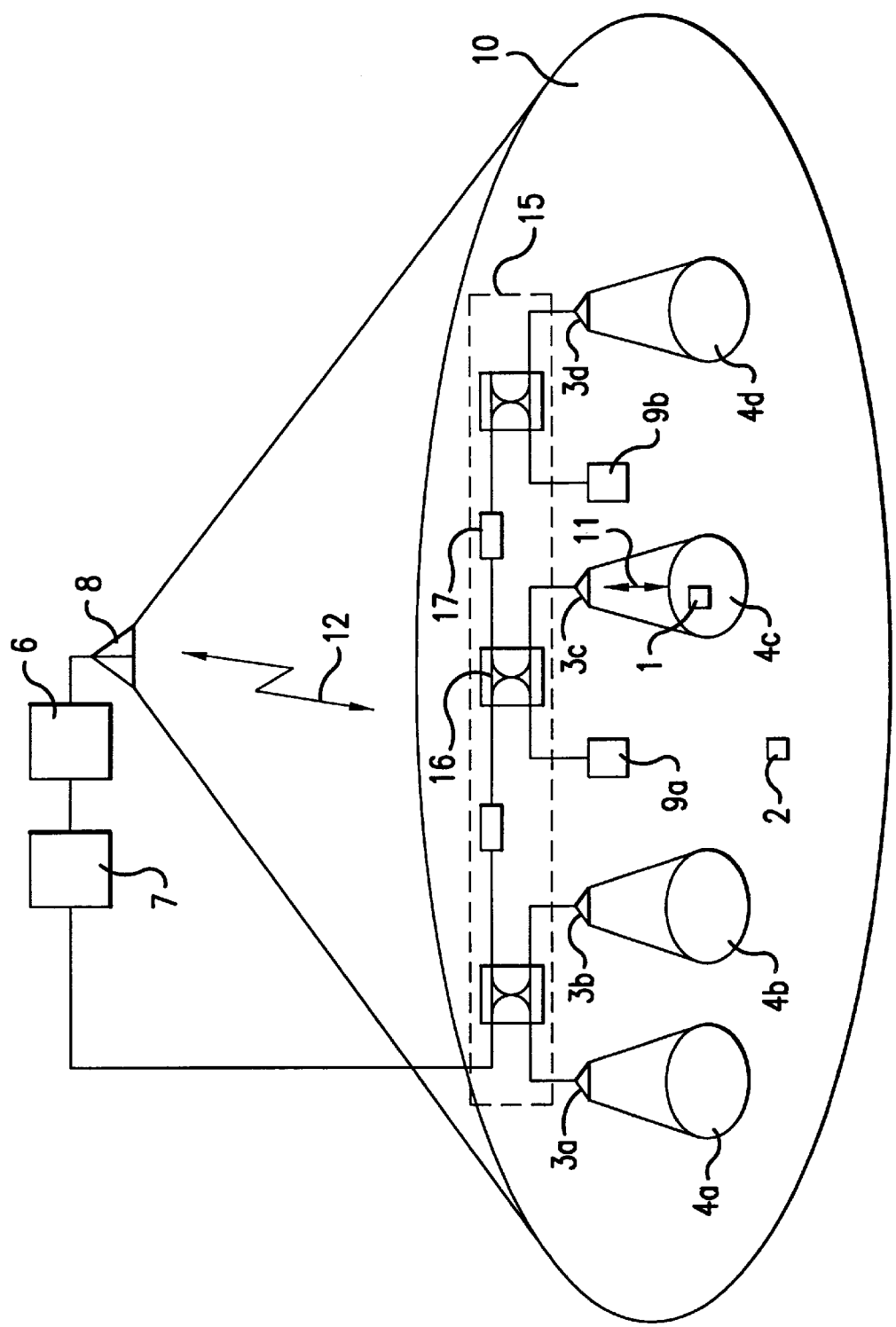
FIG. 14 is a schematic diagram illustrating a fourth embodiment of the present invention.
Figure 15:
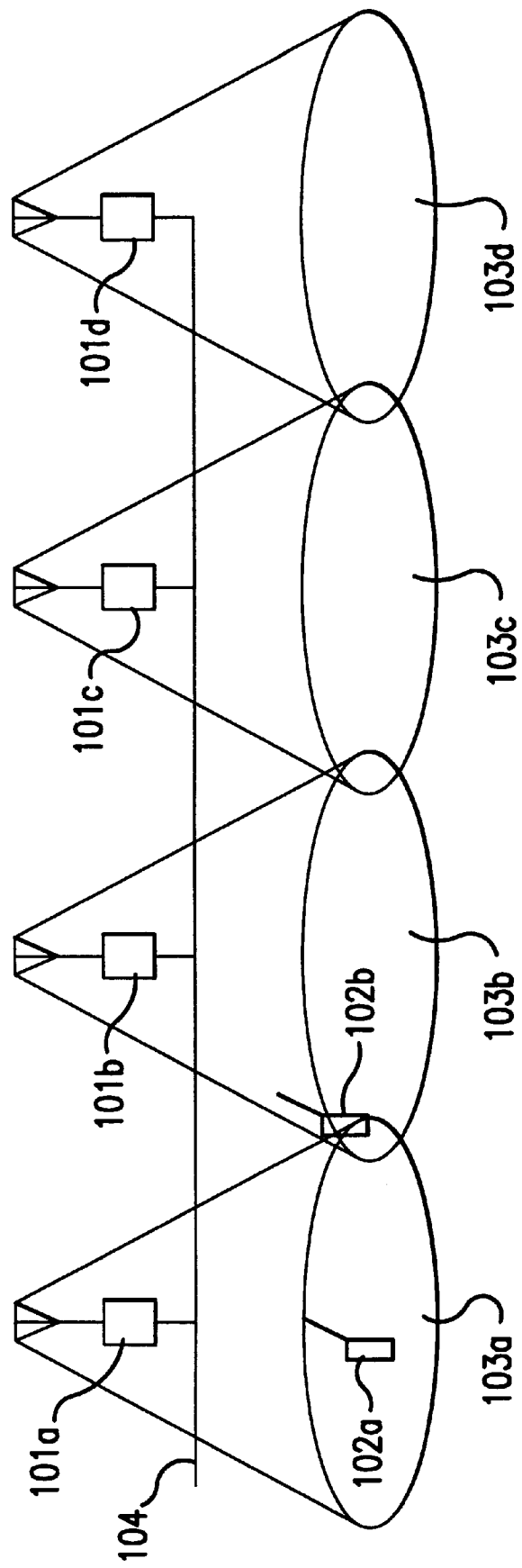
FIG. 15 is a schematic diagram illustrating a conventional cellular communication network.
Figure 16:
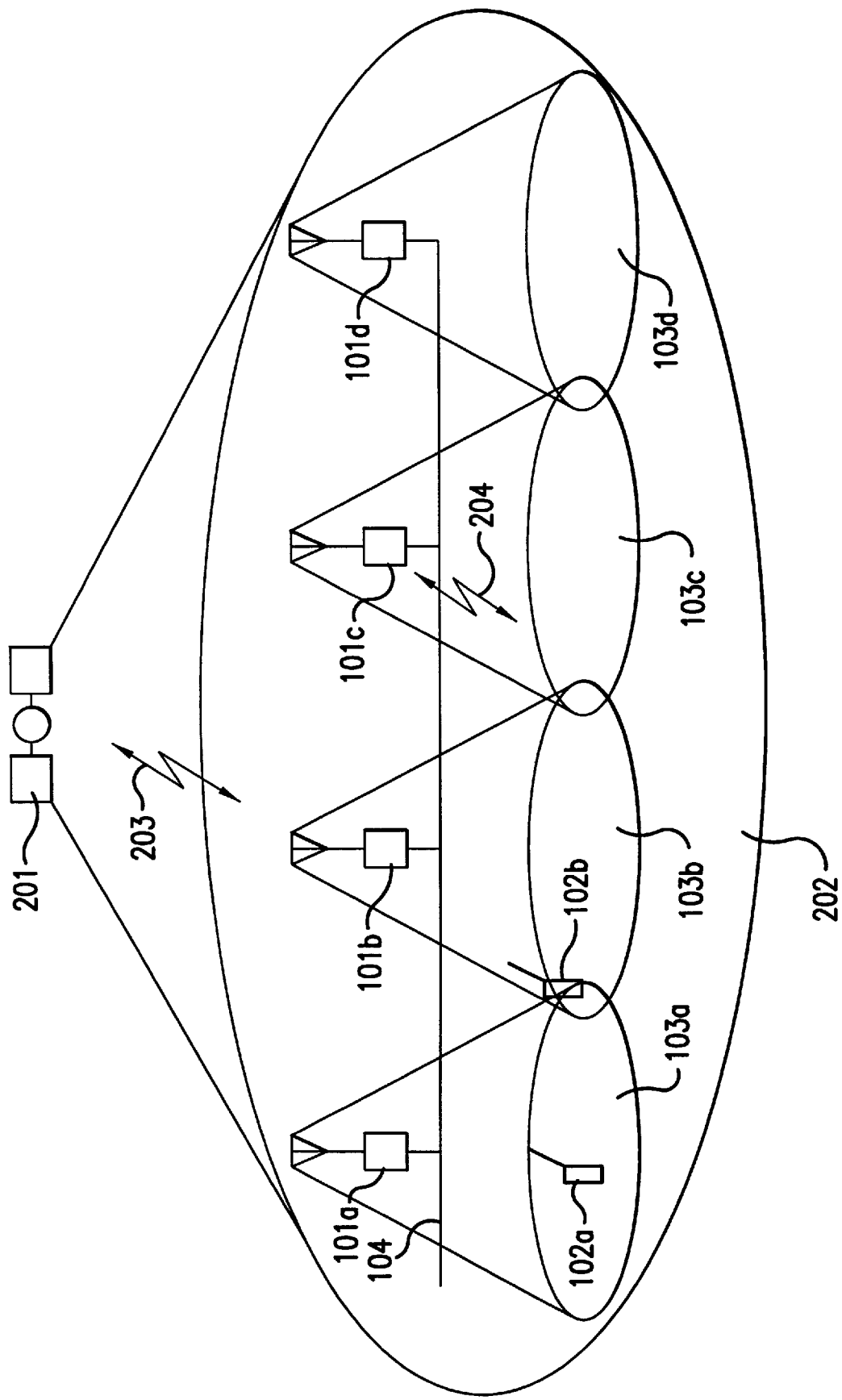
FIG. 16 is a schematic diagram illustrating a conventional overlay type cellular.
Figure 17:
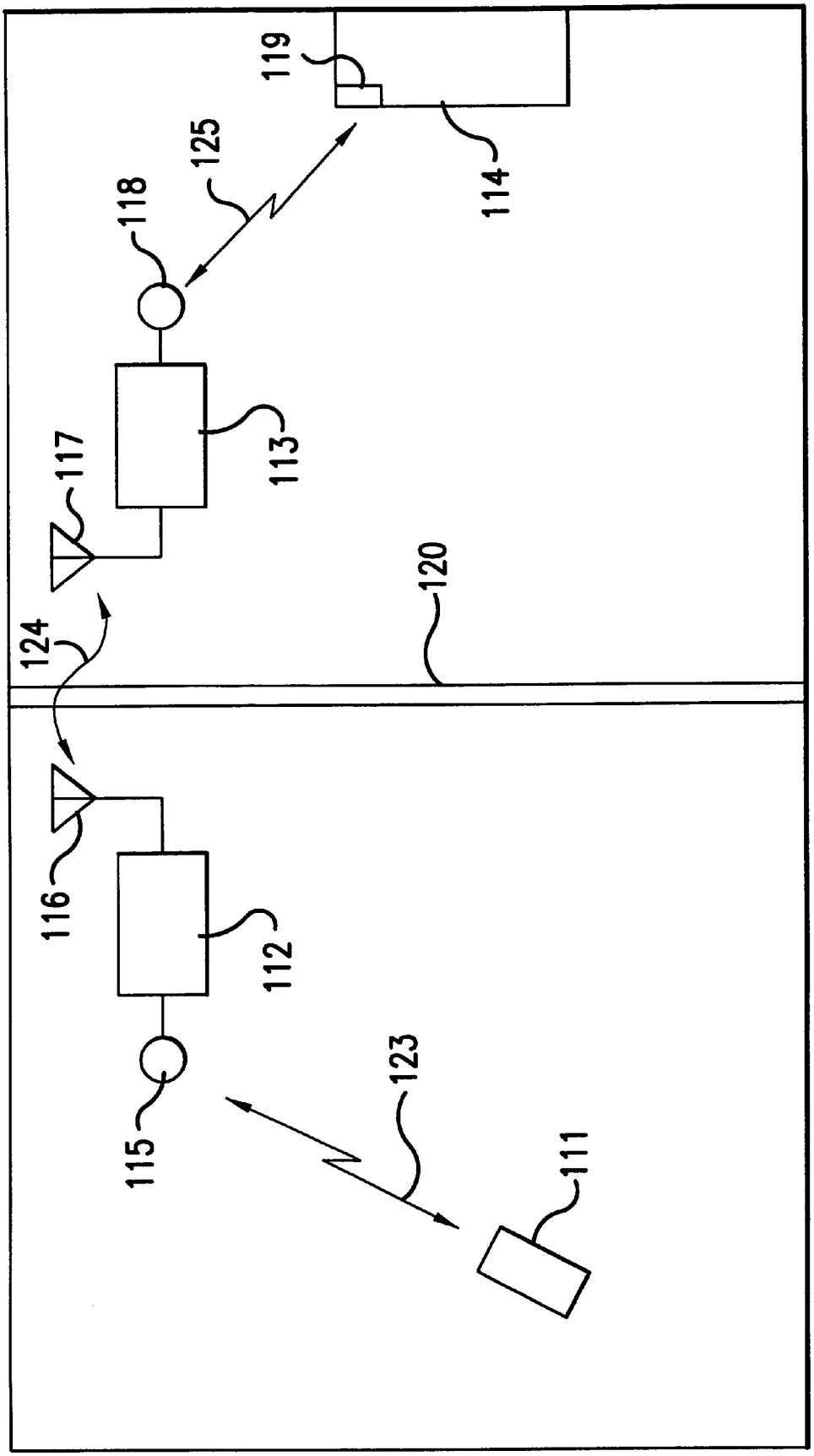
FIG. 17 is a schematic diagram illustrating a conventional art (Japanese Patent Laid-Open Hei. 2-162846)
Figure 18:
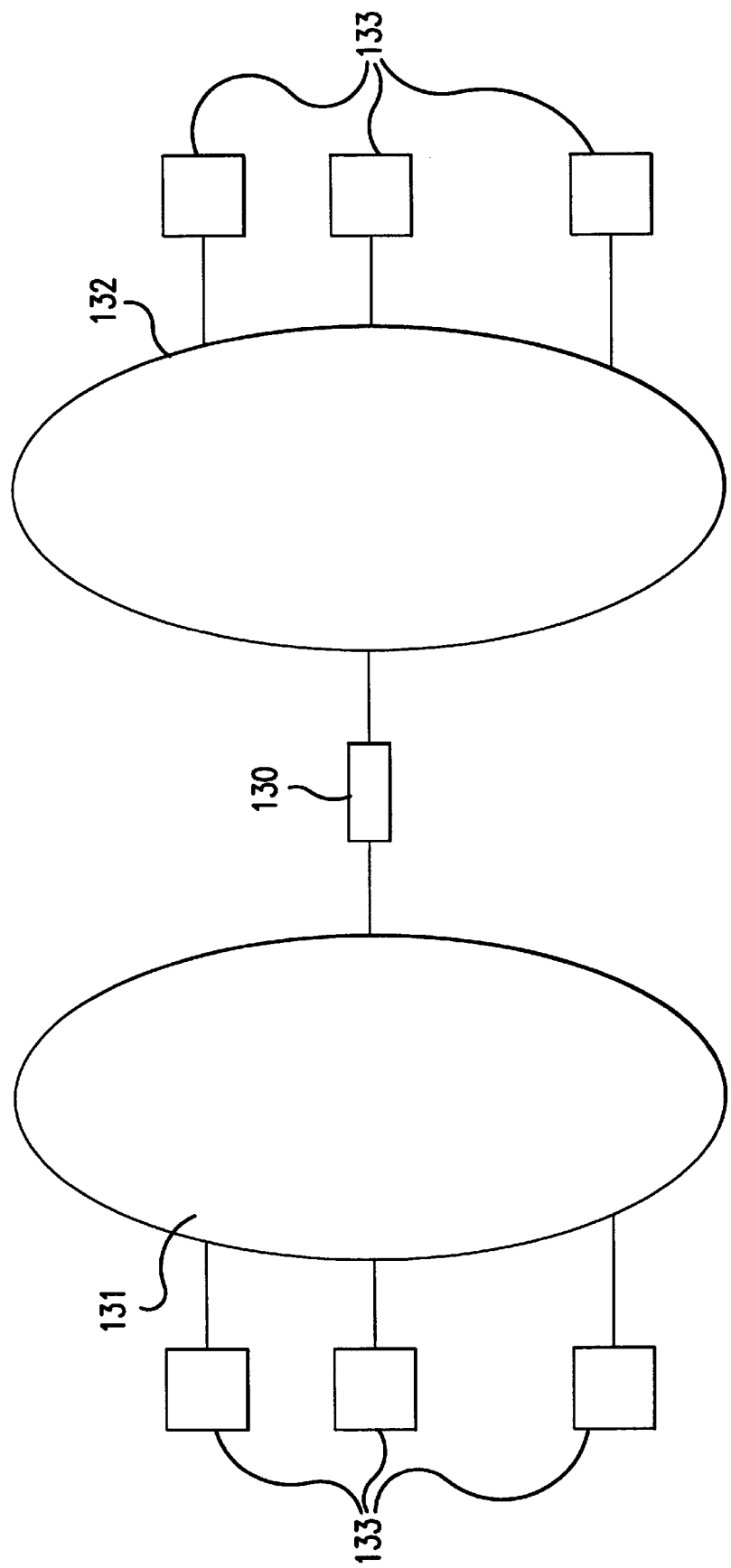
FIG. 18 is a schematic diagram illustrating a configuration which connects two networks via relay device.
Figure 19:
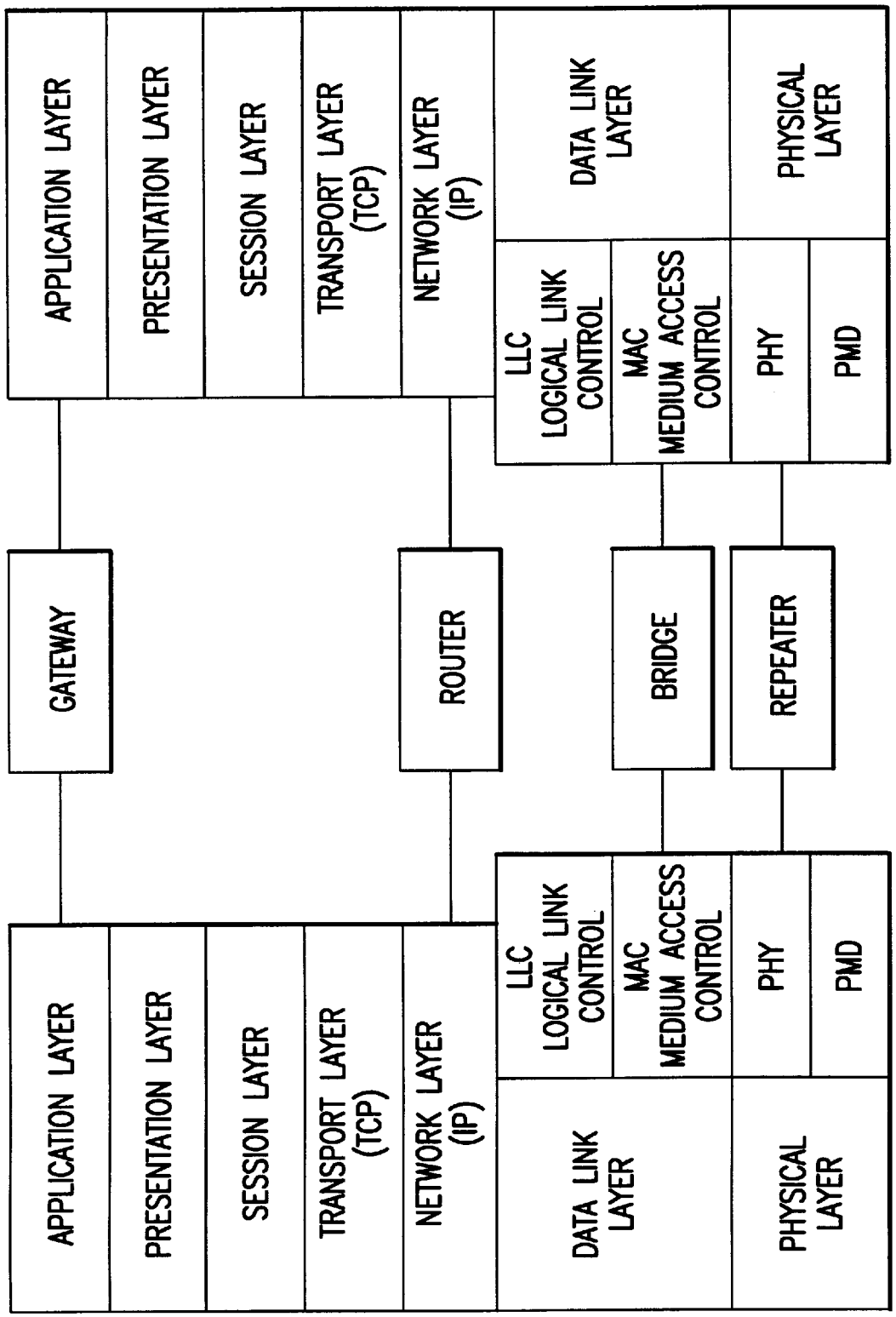
FIG. 19 is a diagram which corresponds a gateway, a router, a bridge and a repeater to the layers defined by OSI reference model.

FIG. 14 shows a configuration according to a fourth embodiment of the present invention. This embodiment is characterized by a coupled star network employed as a wiring network 15 which connects micro cells. The couple star network 15 has a configuration in that interconnectable star couplers 16 are connected via bi-directional optical relay amplifier 17. The coupled star network is disclosed by Japanese Patent Laid-Open No. Hei. 5-3457 (U.S. Pat. No. 5,282,257) or Takeshi Ota, "Coupled Star Network: A new Configuration for Optical Local Area Network", IEICE Trans. Commun., 1992, E75B, pp.67–75.

The coupled star network is easily connected to the free space light transmission network in the physical layer. Therefore, since the bridge 13, which is used in the first and second embodiments, becomes unnecessary, network configuration becomes simpler.

In the fourth embodiment of the present invention, mobile stations 1 and 2 used in the first embodiment, each of which has a configuration shown in FIGS. 2 or 3, can be used. Alternatively, mobile stations 1 and 2 used in the second embodiment, each of which has a configuration shown in FIGS. 5 or 6, can be used.

Since the cellular communication network of the present invention forms a micro cell using free space light, which realizes high speed transmission, to cover an important point, and forms a macro cell using a radio wave of low speed transmission to cover the other broad area, the number of base stations for micro cells using free space light can be minimum.

Further, the communication system of the present invention enables the mobile station to have a function for selecting a route of a packet, as a result, reliability of communication and quality of communication service improve.

What is claimed is:

1. A cellular communication network comprising:
a mobile station which has a free space light interface, a radio wave interface and a switching unit for switching to any of the free space light interface and the radio wave interface, wherein the cellular communication network receives from the switching unit a routing signal, the routing signal including address information that directs the routing of communication signals based on a position of the mobile station;
at least one fixed first base station for communicating with the mobile station, through the free space light interface, by way of free space light in a first area;
at least one fixed second base station for communicating with the mobile station, through the radio wave interface, by way of radio waves in a second area; and
a record file that associates an application layer level address with at least two routes.

2. The cellular communication network of claim 1, wherein the second area overlays the first area to form an overlay type cellular communication network.

3. The cellular communication network of claim 1, wherein the communication using free space light employs a contention protocol as a communication system in a data link layer, and the communication using a radio wave employs a virtual circuit switching protocol as a communication system in the data link layer.

4. The cellular communication network of claim 1, wherein the communication using free space light employs a contention protocol as a communication system in a data link layer, and the communication using a radio wave employs a contention protocol as a communication system in the data link layer.

5. The cellular communication network of claim 1, further comprising the at least one fixed first base station being a plurality of fixed first base stations, and a network to connect the plurality of first base stations, wherein the network employs a virtual circuit switching protocol as a communication system in a data link layer.

6. An overlay cellular communication network comprising:
a first base station for providing a first cellular communication network of a first cell size using a first communication medium;
a second base station for providing a second cellular communication network of a second cell size using a second communication medium different from the first communication medium, wherein the second cellular communication network overlays the first cellular communication network, and
a mobile station which has a mobile station identification address in an application layer level, and a plurality of addresses indicating routes to reach the mobile station from the first base station and the second base station, each of said plurality of addresses belonging to one of the data link layer, a network layer, a transport layer, a session layer and a presentation layer, wherein the mobile station initiates switching between the first cellular communication network and the second cellular communication network in the network layer using the mobile station identification address and the plurality of addresses.

7. The overlay cellular communication network of claim 6, further comprising:
a server including a routing database which associates the identification address of the mobile station with the plurality of routing addresses to reach the mobile station.

8. In a cellular communication network which includes
a mobile station having a free space light interface for a communication channel using free space light, a radio wave interface for a communication channel using a radio wave, and a switching unit for switching to any one of the free space light interface and the radio wave interface,
at least one fixed first base station for communicating with the mobile station by way of free space light in a first area,
at least one fixed second base station for communicating with the mobile station by way of a radio wave in a second area, and
a communication method conducted in the mobile station for communicating with any of the at least one first base station and the at least one second base station, said method using the following procedures:
a first communication control procedure including control procedures conducted in a physical layer and a data link layer for a communication channel using free space light;
a second communication control procedure including control procedures conducted in the physical layer and the data link layer for a communication channel using a radio wave; and
a communication procedure conducted in or above a network layer, for selecting any of a packet route via the communication channel using free space light for a transmission medium, and a packet route via the communication channel using a radio wave for a transmission medium.

9. In a cellular communication network which includes
a mobile station having a free space light interface for a communication channel using free space light, a radio wave interface for a communication channel using a radio wave, and a switching unit for switching to any one of the free space light interface and the radio wave interface,
at least one fixed first base station for communicating with the mobile station by way of free space light in a first area, and
a fixed second base station for communicating with the mobile station by way of a radio wave in a second area,
a communication method conducted in the mobile station for communicating with any of the at least one first base station and the at least one second base station, said method using the following procedures:
a first communication control procedure including control procedures in a physical layer, a data link layer and a network layer for the communication channel using free space light as a transmission medium;
a second communication control procedure including control procedures conducted in the physical layer, the data link layer and the network layer for the communication channel using a radio wave; and
a communication procedure conducted in the transport layer, for selecting any of a packet route via the communication channel using free space light, and a packet route via the communication channel using a radio wave.

10. In a cellular communication network which includes:
a mobile station having a free space light interface for a communication channel using free space light, a radio wave interface for a communication channel using a radio wave, and a switching unit for switching to any of the free space light interface and the radio wave interface,
at least one fixed first base station for communicating with the mobile station by way of free space light in a first area, and
at least one fixed second base station for communicating with the mobile station by way of a radio wave in a second area,
a communication method conducted in the mobile station for communicating with any of the at least one first base station and the at least one second base station, said method using the following procedures:
a first communication control procedure including control procedures conducted in a physical layer, a data link layer, a network layer and a transport layer for a communication channel using free space light;
a second communication control procedure including control procedures conducted in the physical layer, the data link layer, the network layer and the transport layer for a communication channel using a radio wave for a transmission medium; and
a communication procedure in a session layer, for selecting any of a packet route via the communication channel using free space light for a transmission medium, and a packet route via the communication channel using a radio wave for a transmission medium and for checking whether a data entity to be transmitted needs real time processing or not and selecting the communication channel using a radio wave for a transmission medium if the data entity needs real time processing.

11. The communication method of claim 8, wherein the communication procedure selects in the session layer any of a packet route via the communication channel using free space light, and a packet route via the communication channel using a radio wave.

12. In an overlay cellular communication network which includes:
a first base station for providing a first cellular communication network of a first cell size using a first communication medium,
a second base station for providing a second cellular communication network of a second cell size using a second communication medium different from the first communication medium, wherein the second cellular communication network overlays the first cellular communication network, and
a mobile station which has a mobile station identification address in an application layer level, and a plurality of addresses indicating routes to reach the mobile station via the first cell and the second cell, each of said plurality of addresses belonging to one of a data link layer, a network layer, a transport layer, a session layer and a presentation layer, wherein the mobile station initiates switching between the first base station and the second base station using the mobile station identification address and the plurality of addresses,
a communication method conducted in the mobile station comprising the steps of:
adding an application header including the mobile station identification address defined in the application layer to a data entity to be transmitted, to form a packet; and
successively adding a header in and below the presentation layer to the packet.

13. A mobile station used in a cellular communication network, comprising:

an interface for free space light;

an interface for a radio wave;

a mobile station identification address in an application layer level that includes at least two routes; and a switching unit for switching to any of the free space light interface and the radio wave interface, wherein the switching unit sends a routing signal to the cellular communication network, the routing signal including address information that directs the routing of communication signals based on a position of the mobile station.

14. A mobile station used in a cellular communication network, comprising:

a mobile station identification address in an application layer level that includes at least two routes; and a plurality of addresses which indicates routes to reach the mobile station through a first communication network using a first communication medium or a second communication network using a second communication medium different from the first communication medium, wherein each address belongs to a corresponding one of a data link layer, a network layer, a transport layer, a session layer and a presentation layer and wherein the mobile station initiates switching between the first communication network and the second communication network using the mobile station identification address and the plurality of addresses.

15. A cellular communication network comprising:

a mobile station which has a free space light interface, a radio wave interface and a switching unit for switching to any of the free space light interface and the radio wave interface;

at least one micro cell, each micro cell being comprised of at least one fixed first base station, the at least one fixed first based station for communicating with the mobile station by way of free space light; and at least one macro cell, each macro cell being comprised of at least one fixed second base station for communicating with the mobile station by way of radio waves, wherein the switching unit of the mobile station switches to the at least one macro cell if the mobile station moves frequently, and wherein the switching unit of the mobile station switches to the at least one micro cell if the mobile station moves infrequently, the switching to the at least one macro cell and the at least one micro cell being initiated by the mobile station using a mobile station address and a first address designating a route to reach the mobile station via the at least one macro cell and a second address designating a route to reach the mobile station via the at least one micro cell, each of the first and second addresses belonging to one of a data link layer, network layer, transport layer, session layer and a presentation layer.

16. The cellular communication network of claim 15, wherein the macro cell overlays the micro cell to form an overlay type cellular communication network.

17. The cellular communication network of claim 15, wherein the communication using free space light employs a contention protocol as a communication system in a data link layer, and the communication using a radio wave employs a virtual circuit switching protocol as a communication system in the data link layer.

18. The cellular communication network of claim 15, wherein the communication using free space light employs a contention protocol as a communication system in a data link layer, and the communication using a radio wave employs a contention protocol as a communication system in the data link layer.

19. The cellular communication network of claim 15, further comprising the at least one fixed first base station being a plurality of fixed first base stations, and a network to connect the plurality of first base stations, wherein the network employs a virtual circuit switching protocol as a communication system in a data link layer.

20. A mobile station used in a cellular communication network, comprising:

a free space light interface;

a radio wave interface; and a switching unit for switching to any of the free space light interface and the radio wave interface, wherein the switching unit switches to the radio wave interface if the mobile station moves frequently, and wherein the switching unit switches to the free space light interface if the mobile station moves infrequently, the switching to the free space light interface or the radio wave interface being initiated by the mobile station using a mobile station address and a first address designating a route to reach the mobile station via the free space light interface and a second address designating a route to reach the mobile station via the radio wave interface, each of the first and second addresses belonging to one of a data link layer, network layer, transport layer, session layer and a presentation layer.

\* \* \* \* \*